(12) United States Patent
Deenoo et al.

(10) Patent No.: US 10,462,774 B2
(45) Date of Patent: Oct. 29, 2019

(54) DISCONTINUOUS RECEPTION (DRX) SCHEMES FOR MILLIMETER WAVELENGTH (MMW) DUAL CONNECTIVITY

(71) Applicant: IDAC Holdings, Inc., Wilmington, DE (US)

(72) Inventors: Yugeswar Deenoo, King of Prussia, PA (US); Samian Kaur, Plymouth Meeting, PA (US); Ravikumar V. Pragada, Warrington, PA (US); Stephen E. Terry, Northport, NY (US)

(73) Assignee: IDAC Holdings, Inc., Wilmington, DE (US)

( * ) Notice: Subject to any disclaimer, the term of this patent is extended or adjusted under 35 U.S.C. 154(b) by 4 days.

(21) Appl. No.: 15/716,466

(22) Filed: Sep. 26, 2017

(65) Prior Publication Data

US 2018/0020503 A1  Jan. 18, 2018

Related U.S. Application Data

(63) Continuation of application No. 14/784,481, filed as application No. PCT/US2014/034074 on Apr. 15, 2014, now Pat. No. 9,801,232.
(Continued)

(51) Int. Cl.
*H04W 4/00* (2018.01)
*H04W 72/04* (2009.01)
(Continued)

(52) U.S. Cl.
CPC ......... *H04W 72/042* (2013.01); *H04W 24/08* (2013.01); *H04W 72/046* (2013.01);
(Continued)

(58) Field of Classification Search
CPC ... H04W 72/042; H04W 76/28; H04W 24/08; H04W 72/046; H04W 16/32; H04W 84/045
See application file for complete search history.

(56) References Cited

U.S. PATENT DOCUMENTS 9,801,232 B2 * 10/2017 Deenoo ............... H04W 72/046
2008/0090573 A1   4/2008 Kim et al.
(Continued)

FOREIGN PATENT DOCUMENTS

CN    102204392 A    9/2011
CN    102484800 A    5/2012
(Continued)

OTHER PUBLICATIONS

3rd Generation Partnership Project (3GPP), TR 36.913 V11.0.0, "Technical Specification Group Radio Access Network, Requirements for Further Advancements for Evolved Universal Terrestrial Radio Access (E-UTRA) (LTE-Advanced) (Release 11)", Sep. 2012, pp. 1-15.
(Continued)

*Primary Examiner* — Clemence S Han
(74) *Attorney, Agent, or Firm* — Condo Roccia Koptiw LLP

(57) ABSTRACT

Systems, methods, and instrumentalities are provided to implement a method for controlling discontinuous reception (DRX). A wireless transmit/receive unit (WTRU) may enter into a DRX state on a first cell layer. The WTRU may transmit, on a second cell layer, a DRX indication of the first cell layer. The WTRU may receive, on the second cell layer, a deactivation signal corresponding to the first cell layer. The WTRU may deactivate, based on the deactivation signal received on the second cell layer, the first cell layer. The WTRU may receive, on the second cell layer, an activation signal corresponding to the first, cell layer. The WTRU,
(Continued)

based on the activation signal, may activate the first cell layer.

20 Claims, 21 Drawing Sheets

Related U.S. Application Data

(60) Provisional application No. 61/812,202, filed on Apr. 15, 2013, provisional application No. 61/925,870, filed on Jan. 10, 2014.

(51) Int. Cl.
    *H04W 24/08*     (2009.01)
    *H04W 76/28*     (2018.01)
    *H04W 16/32*     (2009.01)
    *H04W 84/04*     (2009.01)

(52) U.S. Cl.
    CPC ............ *H04W 76/28* (2018.02); *H04W 16/32* (2013.01); *H04W 84/045* (2013.01)

(56) References Cited

U.S. PATENT DOCUMENTS

| | | |
|---|---|---|
| 2010/0014429 A1 | 1/2010 | Kim et al. |
| 2010/0190488 A1 | 7/2010 | Jung et al. |
| 2011/0237231 A1 | 9/2011 | Horneman et al. |
| 2012/0115471 A1 | 5/2012 | Awoniyi et al. |
| 2012/0263088 A1 | 10/2012 | Terry et al. |
| 2013/0308717 A1* | 11/2013 | Maltsev; Alexander ............ H04B 7/0417 375/267 |
| 2013/0336270 A1 | 12/2013 | Nagata et al. |
| 2014/0044044 A1* | 2/2014 | Josiam .................. H04W 24/10 370/328 |
| 2015/0215077 A1 | 7/2015 | Ratasuk et al. |
| 2015/0373767 A1 | 12/2015 | Park et al. |
| 2016/0044517 A1* | 2/2016 | Raghavan ............. H04W 16/28 370/329 |

FOREIGN PATENT DOCUMENTS

| | | |
|---|---|---|
| EP | 2663116 A1 | 11/2013 |
| JP | 2012-147125 A | 8/2012 |
| JP | 2015-500605 A | 1/2015 |
| JP | 2015-519854 A | 7/2015 |
| KR | 10-2013-0028786 A | 3/2013 |
| WO | WO 2010/124865 A2 | 11/2010 |
| WO | WO 2010/151186 A1 | 12/2010 |
| WO | WO 2011/025295 A2 | 3/2011 |
| WO | WO 2012/093687 A1 | 7/2012 |
| WO | WO 2013/086410 A2 | 6/2013 |
| WO | WO 2013/187693 A1 | 12/2013 |

OTHER PUBLICATIONS

3rd Generation Partnership Project (3GPP), TR 36.932 V12.1.0, "Technical Specification Group Radio Access Network, Scenarios and Requirements for Small Cell Enhancements for E-UTRA and E-UTRAN (Release 12)", Mar. 2013, pp. 1-14.
3rd Generation Partnership Project (3GPP), TS 36.212 V11.3.0, "Technical Specification Group Radio Access Network, Evolved Universal Terrestrial Radio Access (E-UTRA), Multiplexing and Channel Coding (Release 11 )", Jun. 2013, pp. 1-84.
3rd Generation Partnership Project (3GPP), TS 36.213 V11.4.0, "Technical Specification Group Radio Access Network, Evolved Universal Terrestrial Radio Access (E-UTRA), Physical Layer Procedures (Release 11 )", Sep. 2013, pp. 1-182.
3rd Generation Partnership Project (3GPP), TS 36.300 V11.6.0, "Technical Specification Group Radio Access Network, Evolved Universal Terrestrial Radio Access (E-UTRA) and Evolved Universal Terrestrial Radio Access Network (E-UTRAN), Overall Description, Stage 2 (Release 11)", Jun. 2013, pp. 1-210.
3rd Generation Partnership Project (3GPP), TS 36.304 V11.4.0, "Technical Specification Group Radio Access Network, Evolved Universal Terrestrial Radio Access (E-UTRA), User Equipment (UE) Procedures in Idle Mode (Release 11)", Jun. 2013, pp. 1-34.
3rd Generation Partnership Project (3GPP), TS 36.321 V11.3.0, "Technical Specification Group Radio Access Network, Evolved Universal Terrestrial Radio Access (E-UTRA), Medium Access Control (MAC) Protocol Specification (Release 11 )", Jun. 2013, pp. 1-57.
3rd Generation Partnership Project (3GPP), TS 36.322 V11.0.0, "Technical Specification Group Radio Access Network, Evolved Universal Terrestrial Radio Access (E-UTRA), Radio Link Control (RLC) Protocol Specification (Release 11 )", Sep. 2012, pp. 1-39.
3rd Generation Partnership Project (3GPP), TS 36.331 V11.4.0, "Technical Specification Group Radio Access Network, Evolved Universal Terrestrial Radio Access (E-UTRA), Radio Resource Control (RRC), Protocol Specification (Release 11)", Jun. 2013, pp. 1-346.
Raaf et al., "Vision for Beyond 4G Broadband Radio Systems", IEEE 22nd International Symposium on Personal, Indoor and Mobile Radio Communications, 2011, pp. 2369-2373.
Vinella et al., "Discontinuous Reception and Transmission (DRX/DTX) Strategies in Long Term Evolution (L TE) for Voice-Over-IP (VOIP) Traffic Under Both Full-Dynamic and Semi-Persistent Packet Scheduling Policies", Nokia Siemens Networks, Alborg University Denmark, Nov. 20, 2009, 123 pages.

* cited by examiner

DISCONTINUOUS RECEPTION (DRX) SCHEMES FOR MILLIMETER WAVELENGTH (MMW) DUAL CONNECTIVITY

CROSS-REFERENCE TO RELATED APPLICATIONS

This application is a continuation application of U.S. patent application Ser. No. 14/784,481, filed Oct. 14, 2015; which is the National Stage Entry under 35 U.S.C. § 371 of Patent Cooperation Treaty Application No. PCT/US2014/034074, filed Apr. 15, 2014, which claims the benefit of U.S. Provisional Patent Application No. 61/812,202, filed Apr. 15, 2013 and U.S. Provisional Patent Application No. 61/925,870, filed Jan. 10, 2014 the contents of which are hereby incorporated by reference herein.

BACKGROUND

The predicable demand for data, and corresponding increase in data delivery capacity, has come to be known as Cooper's Law (which states that the total capacity will double about every 30 months). In order to meet the rapidly growing demand for mobile data, one strategy may be to use smaller cells. The use of small cells may imply an increased spatial reuse of the same spectrum to achieve greater capacity.

The use of additional spectrum, for example 3.5 GHz and higher frequencies, may be used to get large bandwidth channels. In order to close the link budget for millimeter wavelengths (mmWs), highly directional antennas may be needed. The use of higher frequencies and directional antennas may make it less likely that a transmission may cause much interference for unintended receivers. The use of high frequency carriers (e.g., in the mmW spectrum) may make wide amounts of spectrum available. As an example, for 60 GHz, the available unlicensed spectrum may be 7 GHz wide. Additional unlicensed spectrum may be available as licensed, lightly licensed, or unlicensed spectrum.

A mmW Hotspot (mmH) architecture may be driven by the need for small cells and the use of mmW carrier frequencies. The mmH architecture may include small mmW base stations overlaid on a cellular network. The mmW base stations may be denser than the traditional macro eNBs. The mmW base stations may use mmW MESH networks as backhaul to the macro eNBs (or other wired/wireless aggregation points). Phased array antennas may be used to provide backhaul links. Limited available transmit (TX) power and a low interference environment of phased array antennas may enable a flexible backhaul architecture. The phased array antennas may create narrow steerable beams. The narrow steerable beams may provide backhaul links that may be easier to deploy than adding new wired backhaul links. Because the beams are narrow and steerable, the beams may provide an adaptable MESH backhaul with pseudo-wired low interference connections between backhaul links.

The coexistence of a macro cell layer and a small (e.g., mmW) cell layer may lead to user equipment (UE) connected to both the macro and the small-cell layer simultaneously. Dual-connectivity may introduce new challenges for battery consumption of the UE. For a UE that may be connected to a small cell layer and a macro cell layer, current discontinuous reception (DRX) mechanisms may be inadequate.

SUMMARY

A WTRU may be connected to a small cell, such as a small cell eNB (SCeNB). The small cell may be a dual connectivity small cell capable of transmitting on a millimeter wavelength (mmW) carrier as well as on another air interface, such as an LTE carrier, which may be used as an example. The WTRU may be capable of operating on the mmW carrier as well as on another air interface, such as an LTE carrier, which may be used as an example. The small cell may use the LTE layer to provide control signaling for DRX operation in the WTRU. The WTRU may be connected to the small cell and a macro cell.

The WTRU may transition between a non-DRX state, a full DRX state, and a partial DRX state. The transitions may be based on various triggers. For example, the WTRU may transition from the non-DRX state to the full DRX state upon expiration of a first inactivity timer, transition from the full DRX state to the partial DRX state upon expiration of a second inactivity timer, and transition from the partial DRX state to the non-DRX state upon expiration of a third inactivity timer. Each DRX state may be associated with a different number of resources, e.g., resources to be monitored. For example, the non-DRX state may be associated with each mmW resource to be monitored, the full DRX state may be associated with a subset of the non-DRX mmW resources (e.g., a first DRX set), and the partial DRX state may be associated with a subset of the full DRX mmW resources (e.g., a second DRX set).

The WTRU may update the small cell with a mmW beam that the WTRU currently prefers, e.g., the preferred beam may change due to the directional nature of mmW transmissions, WTRU mobility, etc. The WTRU may perform a mmW measurement associated with the small cell (e.g., the WTRU may measure one or more pilot transmission from the small cell, for example, in accordance with a mmW measurement resource provided to the WTRU). For example, the WTRU may detect one or more mmW beam transmissions from the small cell and determine a preferred mmW DL beam, e.g., determine a signal quality, such as CQI, for each of the one or more mmW beam transmissions and determine the preferred mmW downlink (DL) beam. The WTRU may report, based on the measurement, the preferred mmW DL beam to the small cell (e.g., a mmW DL beam with a signal quality that satisfies a threshold, a mmW DL beam that has the best signal quality, etc.). The WTRU may report the preferred mmW DL beam to the small cell after a reporting offset time. The WTRU may monitor the reported preferred DL beam, e.g., monitor one or more mmW resources associated with a current DRX state on the reported preferred DL beam.

DETAILED DESCRIPTION

A detailed description of illustrative embodiments will now be described with reference to the various figures. Although this description provides a detailed example of possible implementations, it should be noted that the details are intended to be exemplary and in no way limit the scope of the application. The order of the messages may be varied where appropriate. Messages may be omitted if not needed, and, additional messages may be added.

Figure 1A:
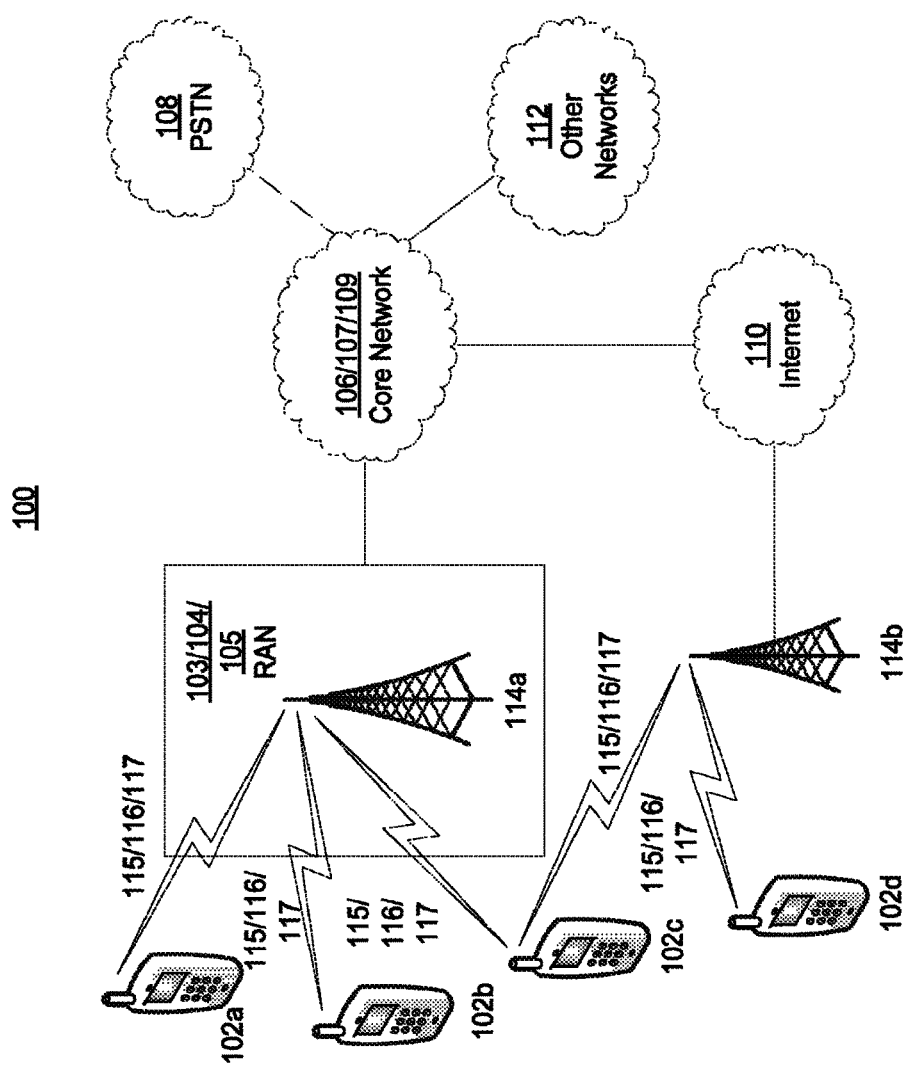
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a. 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. A WTRU and user equipment (UE) may be interchangeably used herein. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include wireless transmit/receive unit (WTRU), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, and the like. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, e.g., one for each sector of the cell. In an embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In an embodiment, the base station 114a and the WTRUs 102a, 102b, 102c may implement radio technologies such as IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet an embodiment, the base station 114b and the WTRUs 102c, 102d may utilize a cellular-based RAT (e.g., WCDMA, CDMA2000, GSM, LTE, LTE-A) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with a RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite.

The networks 112 may include wired or wireless communications networks owned and/or operated by other service providers. For example, the networks 112 may include a core network connected to one or more RANs, which may employ the same RAT as the RAN 103/104/105 or a different RAT.

Some or all of the WTRUs 102a, 102b, 102c, 102d in the communications system 100 may include multi-mode capabilities, e.g., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
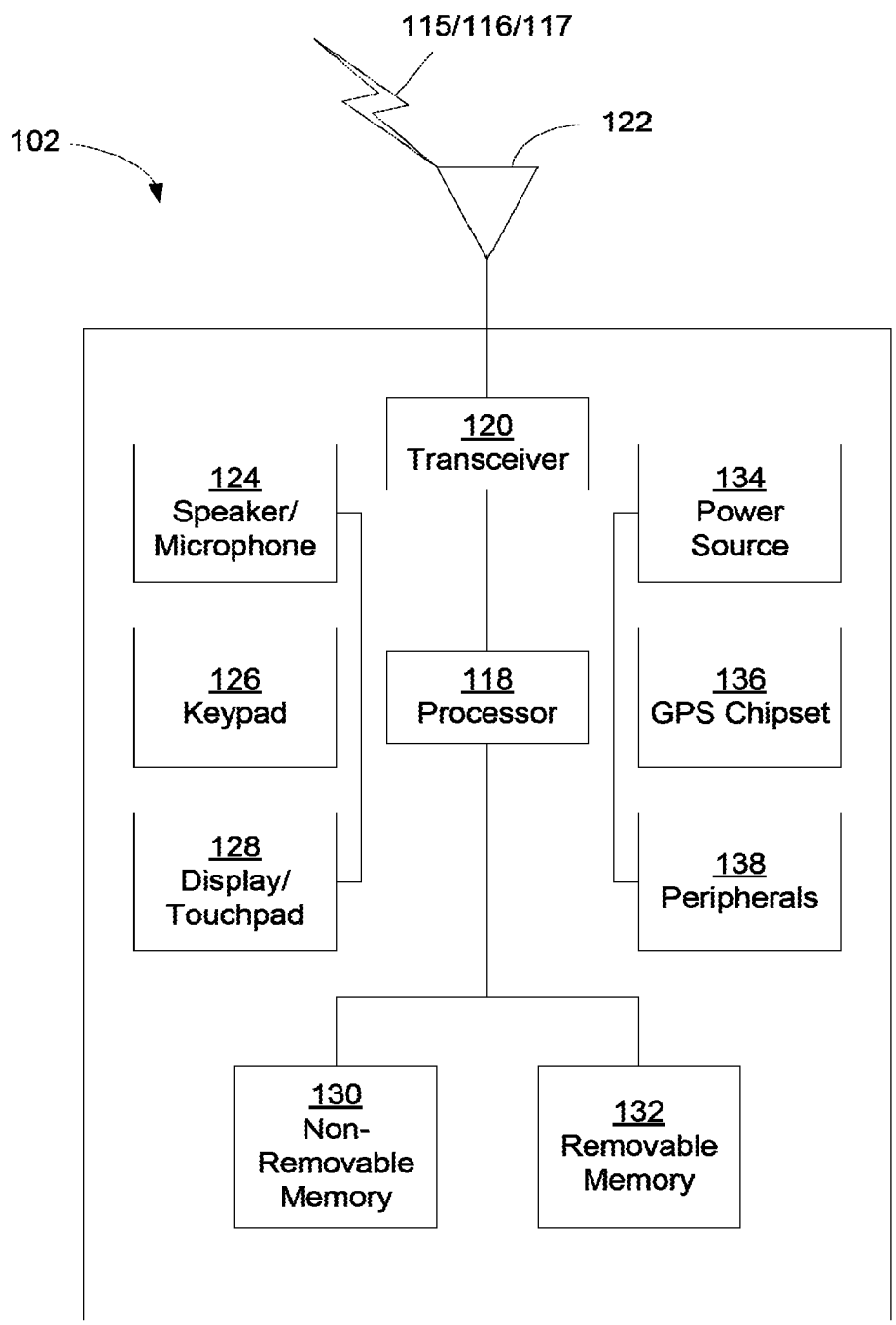
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In an embodiment, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion)), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
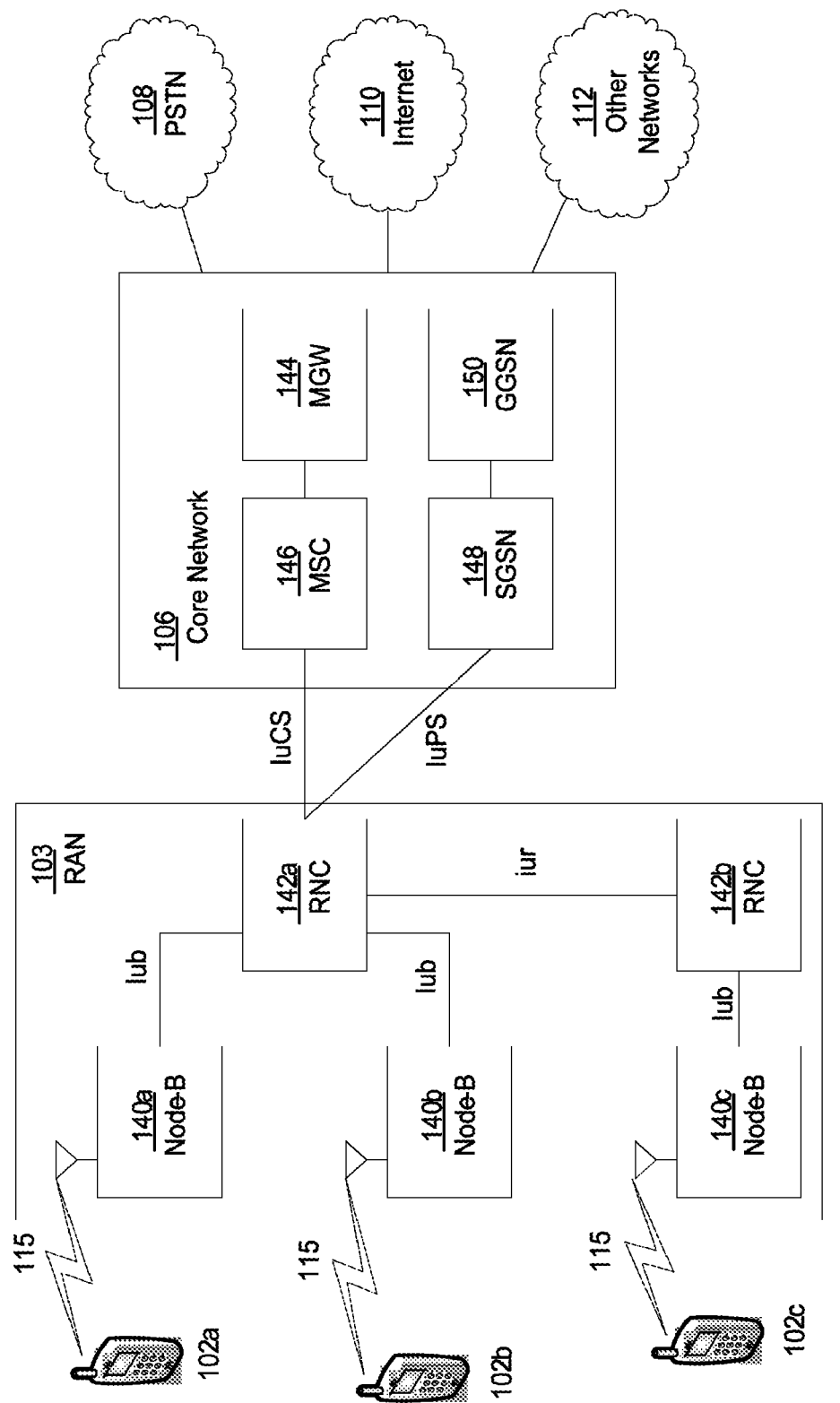
FIG. 1C is a system diagram of an example radio access network and an example core network that may be used within the communications system illustrated in FIG. 1A.

FIG. 1C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macro diversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
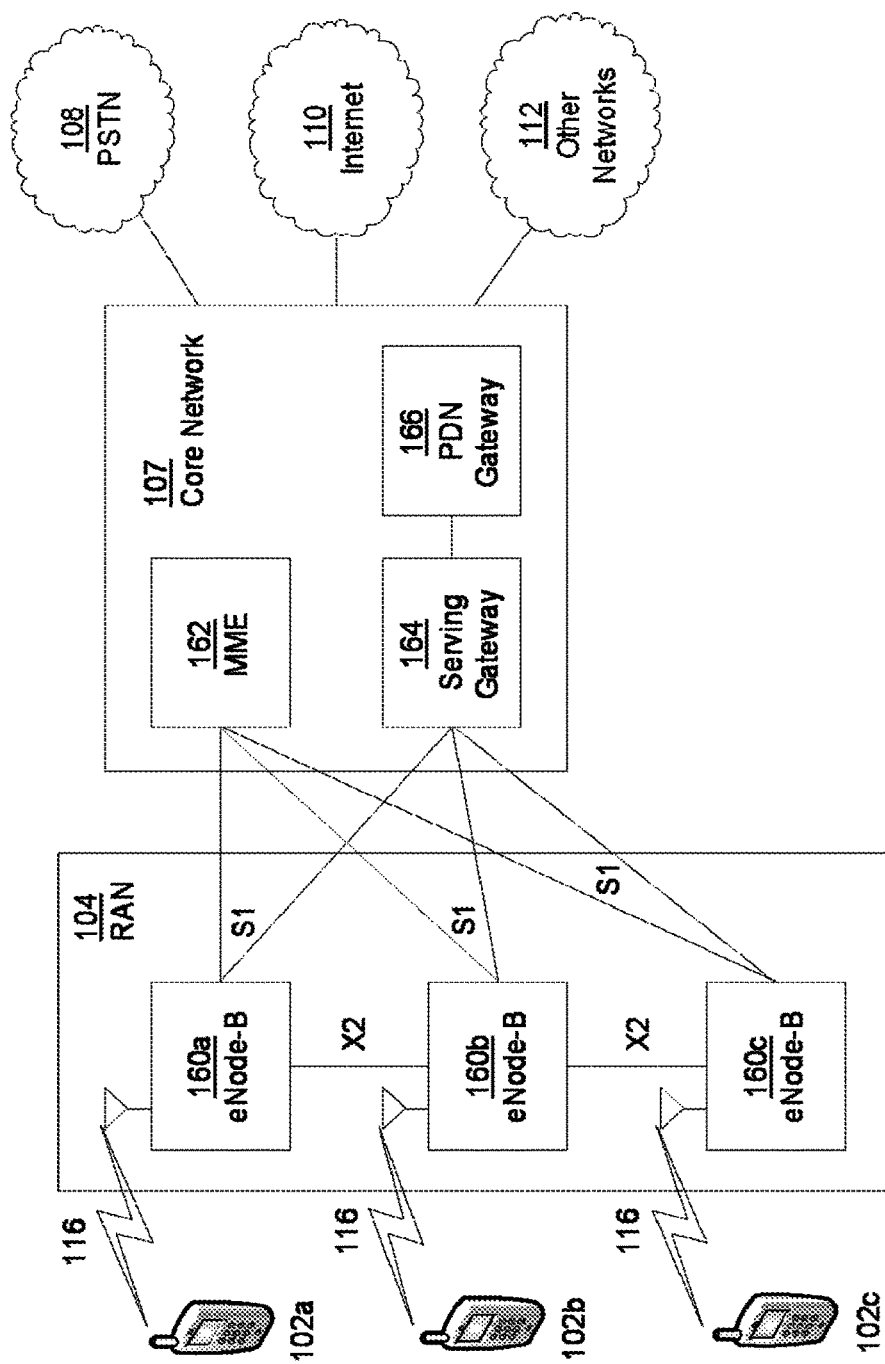
FIG. 1D is a system diagram of an example radio access network and an example core network that may be used within the communications system illustrated in FIG. 1A.

FIG. 1D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160*a*, 160*b*, 160*c* may implement MIMO technology. Thus, the eNode-B 160*a*, for example, may use multiple antennas to transmit wireless signals to, and receive wireless signals from, the WTRU 102*a*.

Each of the eNode-Bs 160*a*, 160*b*, 160*c* may be associated with a particular cell (not shown) and may be configured to handle radio resource management decisions, handover decisions, scheduling of users in the uplink and/or downlink, and the like. As shown in FIG. 1D, the eNode-Bs 160*a*, 160*b*, 160*c* may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160*a*, 160*b*, 160*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160*a*, 160*b*, 160*c* in the RAN 104 via the S1 interface. The serving gateway 164 may generally route and forward user data packets to/from the WTRUs 102*a*, 102*b*, 102*c*. The serving gateway 164 may also perform other functions, such as anchoring user planes during inter-eNode B handovers, triggering paging when downlink data is available for the WTRUs 102*a*, 102*b*, 102*c*, managing and storing contexts of the WTRUs 102*a*, 102*b*, 102*c*, and the like.

The serving gateway 164 may also be connected to the PDN gateway 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The core network 107 may facilitate communications with other networks. For example, the core network 107 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102*a*, 102*b*, 102*c* with access to the networks 112, which may include other wired or wireless networks that are owned and/or operated by other service providers.

Figure 1E:
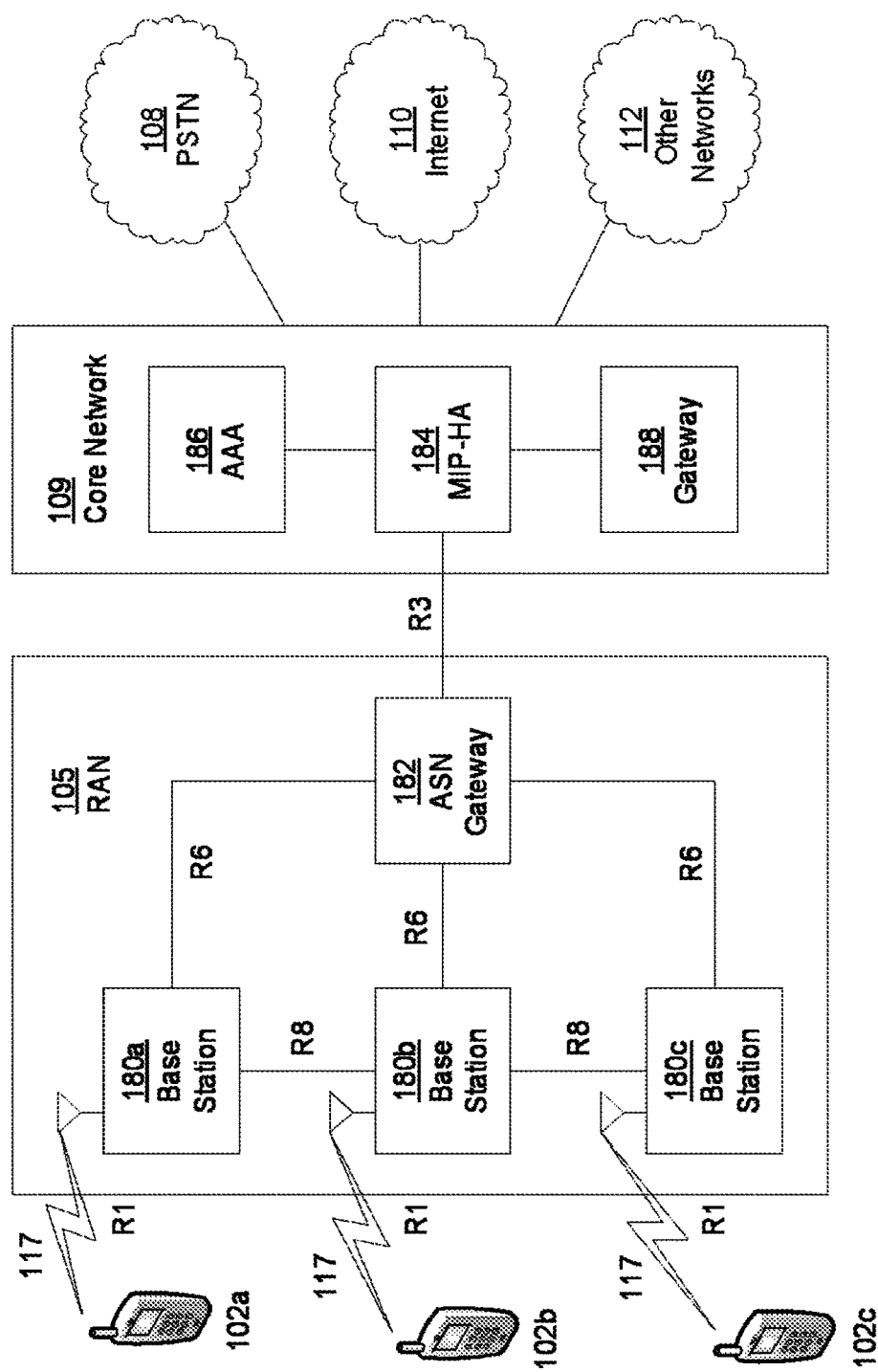
FIG. 1E is a system diagram of an example radio access network and an example core network that may be used within the communications system illustrated in FIG. 1A.

FIG. 1E is a system diagram of the RAN 105 and the core network 109 according to an embodiment. The RAN 105 may be an access service network (ASN) that employs IEEE 802.16 radio technology to communicate with the WTRUs 102*a*. 102*b*, 102*c* over the air interface 117. As will be further discussed below, the communication links between the different functional entities of the WTRUs 102*a*, 102*b*, 102*c*, the RAN 105, and the core network 109 may be defined as reference points.

As shown in FIG. 1E, the RAN 105 may include base stations 180*a*, 180*b*, 180*c*, and an ASN gateway 182, though it will be appreciated that the RAN 105 may include any number of base stations and ASN gateways while remaining consistent with an embodiment. The base stations 180*a*, 180*b*, 180*c* may each be associated with a particular cell (not shown) in the RAN 105 and may each include one or more transceivers for communicating with the WTRUs 102*a*, 102*b*, 102*c* over the air interface 117. In one embodiment, the base stations 180*a*, 180*b*, 180*c* may implement MIMO technology. Thus, the base station 180*a*, for example, may use multiple antennas to transmit wireless signals to, and receive wireless signals from, the WTRU 102*a*. The base stations 180*a*, 180*b*. 180*c* may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102*a*, 102*b*, 102*c* and the RAN 105 may be defined as an R1 reference point that implements the IEEE 802.16 specification. In addition, each of the WTRUs 102*a*, 102*b*, 102*c* may establish a logical interface (not shown) with the core network 109. The logical interface between the WTRUs 102*a*, 102*b*, 102*c* and the core network 109 may be defined as an R2 reference point, which may be used for authentication, authorization, IP host configuration management, and/or mobility management.

The communication link between each of the base stations 180*a*, 180*b*, 180*c* may be defined as an R8 reference point that includes protocols for facilitating WTRU handovers and the transfer of data between base stations. The communication link between the base stations 180*a*, 180*b*, 180*c* and the ASN gateway 182 may be defined as an R6 reference point. The R6 reference point may include protocols for facilitating mobility management based on mobility events associated with each of the WTRUs 102*a*, 102*b*, 102*c*.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102*a*, 102*b*, 102*c* to roam between different ASNs and/or different core networks. The MIP-HA 184 may provide the WTRUs 102*a*, 102*b*, 102*c* with access to packet-switched networks, such as the Internet 110, to facilitate communications between the WTRUs 102*a*, 102*b*, 102*c* and IP-enabled devices. The AAA server 186 may be responsible for user authentication and for supporting user services. The gateway 188 may facilitate interworking with other networks. For example, the gateway 188 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. In addition, the gateway 188 may provide the WTRUs 102*a*, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

With small cell layers overlaid on macro cell layers, a user equipment may be connected (e.g., simultaneously) to a macro layer and a small cell. The small-cell layer and the macro cell layer may be made up of one or more deployment scenarios, including, for example: carrier aggregation on the macro layer with bands X and Y and band X on the small cell layer; small cells supporting carrier aggregation bands that are co-channel with the macro layer; or small cells supporting carrier aggregation bands that are not co-channel with the macro layer.

Discontinuous reception (DRX) and discontinuous transmission (DTX) may be used in cellular systems to save battery consumption in a user equipment (UE). The term UE and WTRU may be used interchangeably. A long term evolution (LTE) system may use DRX by introducing short and/or long DRX cycles. DRX and/or DTX may allow a UE to not have to monitor control channels continuously. Schedulers may take advantage of DRX to handle, for example, semi-persistent or bursty traffic.

In an LTE system (e.g., based on 3GPP LTE release 8), a UE may be configured by a radio resource control (RRC) signal with a DRX functionality that may allow it to monitor the physical downlink control channel (PDCCH) discontinuously. The discontinous monitoring may result in saving of power consumption at the UE. DRX operation may be based on, for example, a long DRX cycle, a DRX inactivity timer, a HARQ RTT Timer, a DRX Retransmission Timer and a Short DRX Cycle, a DRX Short Cycle Timer, and the like.

When a DRX cycle is configured, the active time may include the time while: the on-Duration timer, the DRX inactivity timer, a DRX retransmission timer, or the contention resolution timer for random access is running, a scheduling request is pending, an uplink grant for a pending HARQ retransmission may occur, or a PDCCH indicating a transmission (e.g., a new transmission) addressed to the C-RNTI or Temporary C-RNTI of the UE may not have been received after successful reception of a random access response.

A UE may enter DRX when the on-Duration timer or the DRX inactivity timer expires, or when a DRX command (e.g., carried in MAC control element) may be received in a subframe. In an LTE system, the DRX command may be used to force the UE to enter DRX.

Figure 2:
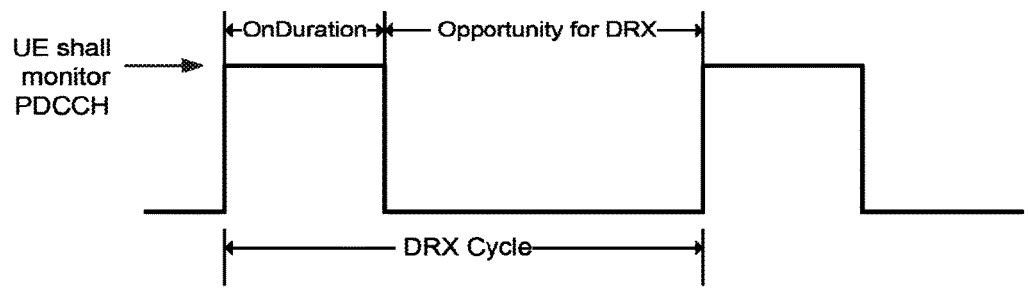
FIG. 2 is a diagram of a discontinuous reception (DRX) cycle.

FIG. 2 illustrates an example of a DRX cycle. During the active time, for a PDCCH subframe (except if the subframe is required for uplink transmission for half-duplex FDD UE operation or the subframe is part of a configured measurement gap), the UE may monitor the PDCCH. If the PDCCH indicates a DL transmission, or a DL assignment has been configured for a subframe, the UE may start the HARQ RTT timer for the corresponding HARQ process and/or stop the DRX Retransmission timer for the corresponding HARQ process. If the PDCCH indicates a transmission (e.g., a new transmission on the DL or UL), the UE may start and/or restart the DRX Inactivity Timer.

For multicarrier operation, one or more UE power savings may be used, which may include one or more of the following: common DRX (e.g., baseline), fast (de-)activation implementation (e.g., MAC CE, or PDCCH), independent DRX. For common DRX, the UE may monitor the PDCCH for each of the component carriers (e.g., configured with PDCCH) in a subframe that may be part of DRX active time. DRX active time may be the same for each of the component carriers. In fast (de-)activation mechanism, secondary cells (SCells) may be activated and/or deactivated by L1 (e.g. PDDCH) or L2 (e.g. MAC CE) signaling. A single activation and/or deactivation command may activate and/or deactivate a subset of the serving cells. For independent DRX, each of the DRX timers may be configured per component carrier (CC). The UE may monitor the PDCCH per CC (e.g., configured with PDCCH). The fast (de-)activation mechanism may be used by itself or in combination with a DRX scheme, e.g., common DRX or independent DRX.

Dual-connectivity may introduce challenges for battery consumption. The UE may be connected (e.g., simultaneously) to one or more cell layers. For example, the UE may be connected to a macro-cell layer and one or more small cell (e.g., mmW) layers. In this disclosure, the term mmW layer and small-cell layer and the terms mmW base-station (mB) and small-cell eNB (SCeNB) may be used interchangeably.

Based on frequencies used in the small-cell layer, the wideband radio implementations may not be able to cover the required bands with a single radio (for example bands below 3 GHz in the macro-cell layer and mmW frequency bands such as 28 GHz, 38 GHz, 60 GHz, in the small-cell layer). Multiple baseband and RF chains may be operated simultaneously. The dual-connectivity model may put stress on battery power restricted UEs. DRX management may be disclosed that may exploit the UE's simultaneous connectivity to macro cell layer and the small-cell layer.

With the introduction of dual-connectivity, devices (e.g., UEs) may be in active data transfer mode in the small-cell layer, but may not communicate with the macro-cell layer. These UEs may continue to use the expensive radio-resources in the macro-cell layer, leading to underutilization of the radio resources in the macro-cell. The UEs may reduce the overall system capacity. Systems, methods, and instrumentalities disclosed herein may improve overall utilization of radio network resources. With an increase in the number of infrastructure nodes and introduction of dense small-cell deployments, there may be a need to optimize and introduce power-save operations in the small-cell layer to reduce operating expenses for the mobile network operators.

Figure 3:
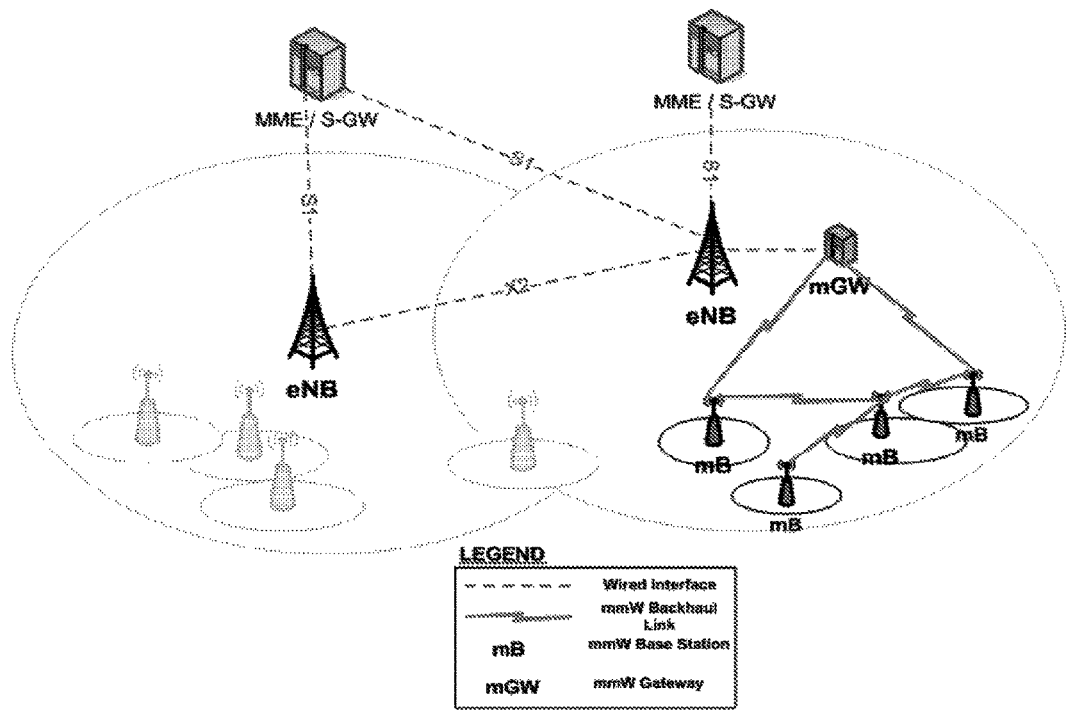
FIG. 3 is a system diagram of an example of tiered mobile communications architecture.

FIG. 3 illustrates an example of a tiered architecture with dual connectivity. The UE may be connected to a macro-cell layer and a small-cell layer (e.g., a mmW layer). In dual connectivity networks, separate data radio bearer (DRB) and/or a single DRB model may be supported. In the separate DRB model, a one to one mapping between packet Data Convergence Protocol (PDCP) and a radio link control (RLC) entity (e.g., similar to third generation partnership project (3GPP) release 10 baseline) may be used. Separate DRBs may be mapped to the macro-cell and the small-cell layers. In the single DRB model, a DRB may be split between a macro and a small cell. One PDCP entity in the macro cell may have multiple (e.g., two) underlying corresponding RLC protocol set entities, one set in macro cell and another set in the small cell.

Other models for control-plane operation for dual-connectivity, including, for example multi-RRC model and transparent signaling radio bearer (SRB) model may be provided. In the multi-RRC model, multiple RRC instances may be maintained in the network and in the handset. The data radio bearers operating at the small-cell layer may be controlled by the RRC at the small-cell layer. The UE may have two or more RRC entities. One entity may be used for the macro-cell layer and other entities may be used for the small-cell layers. The macro cell RRC layer may operate in a master mode, while the small cell RRC layer may operate in a slave mode.

In the transparent SRB model, a RRC layer may be terminated at the macro-cell layer and no RRC layer at the small-cell layer may be used. The small-cell layer may transparently tunnel the SRB data from the macro-cell layer. The configuration required for the transparent SRB at the small-cell may be configured, e.g., by the macro-cell layer.

With dual-connectivity, the UE may be connected to the macro cell layer and the small cell (e.g., mmW) layer simultaneously. Ultra-sleep or deep-sleep mechanism may be provided. Ultra-sleep or deep-sleep may reduce the drain on the battery of the UE (e.g., as compared to dual connectivity to both the macro and the small cell layers). The ultra-sleep mode or deep-sleep mode may be power efficient and may last for long periods of time e.g., longer time periods than the maximum DRX period (e.g., 2.56 msec). Because the UE may be connected to the small-cell layer and the macro-cell layer at the same time, longer sleep durations may be provided.

If a UE is in deep-sleep mode with respect to a small-cell layer, it may monitor the control channels of the macro-cell layer and receive control information required to wake-up the small-cell layer. The control information may be sent in the form of an L1 message, (e.g., by monitoring the PDCCH of the macro-cell), L2 signaling (e.g., by using MAC control element (MAC CE) in macro-cell layer), or radio resource control/non-access stratum (RRC/NAS) signaling (e.g., a paging message). A similar mechanism may be used if a UE that is connected to a small cell layer may go into a deep sleep mode or an ultra-sleep mode on a macro-cell layer. The UE may go to deep-sleep in one layer and monitor control channels in the other dual-connectivity cell layer. The duration of the deep-sleep cycle may be configurable and may depend on the amount of time the UE may stay without losing synchronization in a layer.

A dual connected UE may send a DRX indication to the network, e.g., when it is entering DRX in a layer. The indication may be sent on another layer (e.g., other than the layer in which the UE is entering DRX). The indication may be sent by using L1, L2 (MAC), or RRC signaling. The UE may be configured to send the DRX indication of each of the other configured layers whenever it changes DRX state in the reporting layer. For example, when the UE moves from idle to active state in the primary (e.g., a macro) layer, it may send a report of the DRX state change to other layers.

The SCeNB may send the DRX indication directly to the macro layer over the backhaul indicating the UE state transition from active to idle or vice versa. The small cell may indicate to the UE to transition from active to idle state. One layer may indicate to the UE to move from idle to active state in another layer.

The DRX indication command may include the carriers that may change states. The DRX indication may comprise a DRX state of the carrier (e.g., idle or active), the cell radio network temporary identifier (C-RNTI) of the UE in the layer where status is being indicated. The indication may be sent after the on-Duration expires in one layer or if the UE detects (e.g., autonomously) that on-Duration is about to expire. The UE may send its DRX state on one layer periodically or when requested by the eNB. A prohibit timer may be associated with sending the DRX indication. The UE may be configured with a prohibit timer. The UE may not send the DRX indication when the prohibit timer is active.

A dual connectivity UE may be configured, e.g., via RRC signaling, with common or separate DRX configurations for macro and the small cell layers (e.g., including SCells from one or more SCeNBs). For the SCells within the same eNB, the UE may use the common DRX configuration as the baseline. The UE may enter DRX on the macro and the small cell layers at different times due to a difference in traffic pattern or differences in the DRX configuration.

A UE may be in various states, including, for example, one or more of the following: active in macro and DRX in small cell, DRX in macro and DRX in small cell, DRX in macro and active in small cell, or IDLE in macro and active in small cell.

Figure 4:
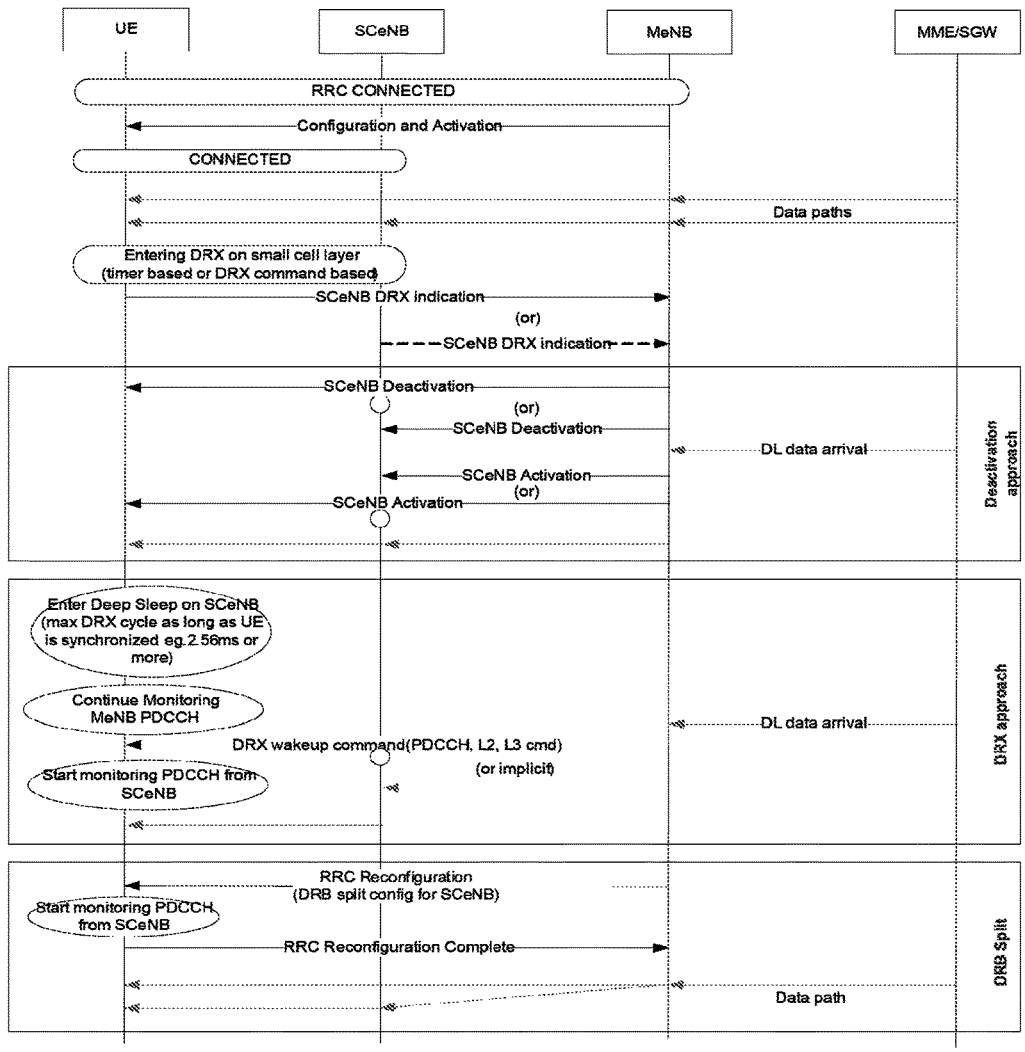
FIG. 4 is a diagram of an example message sequence chart where the user equipment (UE) may be active in the macro cell layer and in a DRX state in the small cell layer.

FIG. 4 illustrates an example of a dual connected UE, which may be in DRX state on the small cell layer and active state in the macro cell layer. Since the small cell (e.g., mmW) layer may have a separate transmit/receive chain, making the macro link active and the small cell link not active may provide power savings. The S1-U may be mapped to the SCeNB, and the data may be sent from the SCeNB to the UE. The macro layer may not be aware of the activity on the small cell layer, or when the UE, on the small cell layer, may change its state from active to idle.

The UE, while active on macro cell layer, may go from active to idle state in the small cell layer. The UE may be connected on two data paths (e.g., one with the SCeNB and the other with the MeNB). The UE may enter DRX mode on the small cell layer. The DRX entry may be timer based or DRX command based. A SCeNB DRX indication signal may be sent to the macro eNB. The SCeNB DRX indication may be signaled from the UE or from the SCeNB. The macro layer may deactivate the small cell and the small cell layer on the UE. When data (e.g., new data) arrives, e.g., on the S1-U downlink, the macro layer may activate the SCeNB, and the small cell carrier in the UE.

The dual connected UE may go from active to idle state on the small cell layer by using, for example, a deactivation approach, a DRX approach, or a DRS split approach. In the deactivation approach, when the connected UE moves to idle and/or deactivated state, the small cell may be dormant in the access link and backhaul. The small cell may be aware of when it may wake up and/or when data (e.g., new data) may be available for the small cell layer. The small cell layer may be configured with its own C-RNTI, and, the small cell layer may read (e.g., periodically read) the PDCCH of the macro cell layer. The SCeNB may go into idle mode and the macro cell layer may page the SCeNB when the macro cell layer may need to wake up the UE.

The small cell eNB may be configured with the C-RNTIs of each of the UEs that may be connected to the small cell. To keep an up to date C-RNTI list, the small cell eNB may read (e.g., periodically) the C-RNTI list from the macro cell layer.

The UE and the SCeNB may go into the ultra-sleep mode in the small (e.g., mmW) cell layer, and, the macro may cell layer may wake up the UE using a DRX wake up command. The DRX wake up command may be cross carrier or cross layer. The DRX wake up command may indicate the carrier in the small cell layer that may need awakening.

When the macro cell layer detects that the SCeNB is free, e.g., due to initial indication by the UE or the SCeNB, the macro cell layer may initiate a multi-flow on existing data radio bearers that may be supported by the macro cell layer. The macro cell layer may split existing traffic to the macro and the small cell by reconfiguring the existing radio bearers to operate in two layers.

Figure 5:
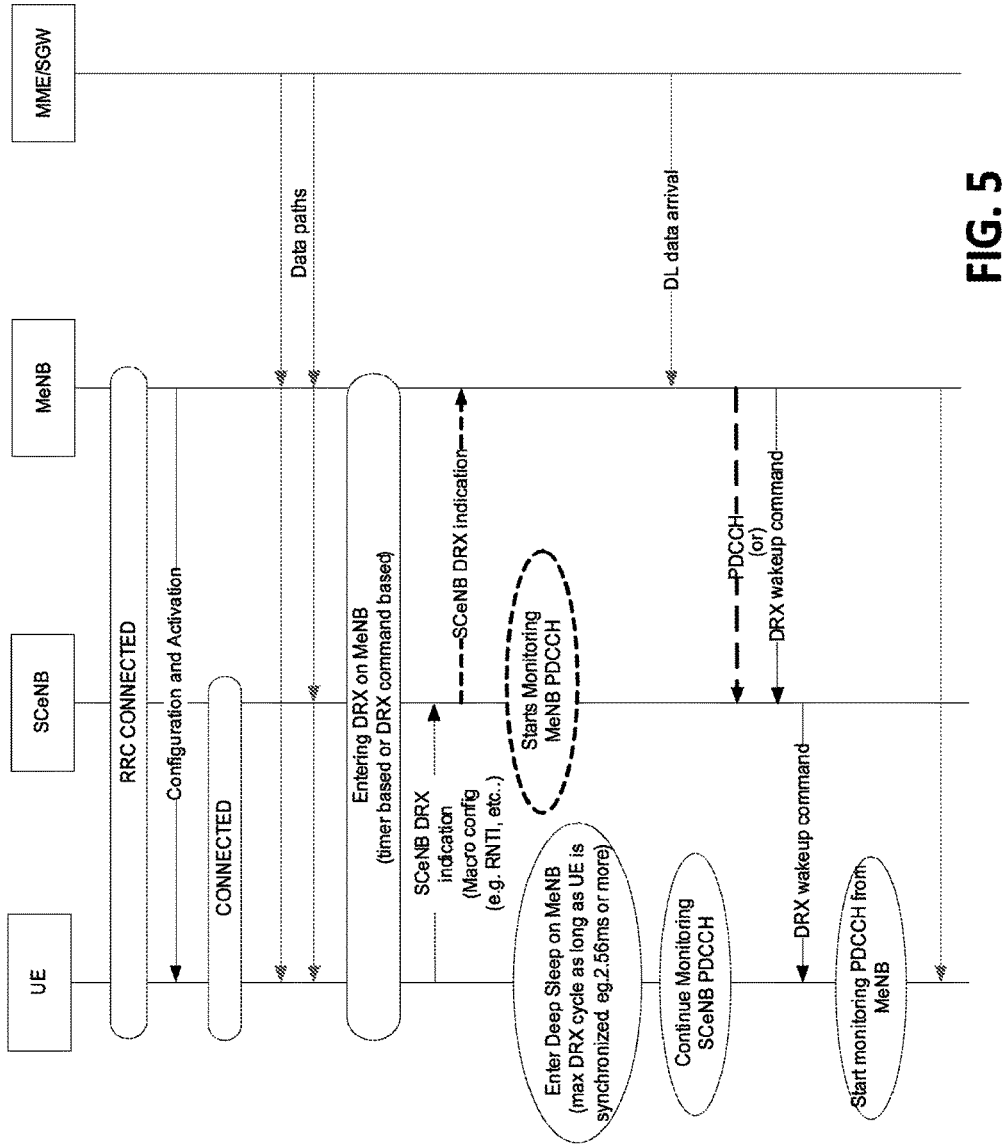
FIG. 5 is a diagram of an example message sequence chart where the UE may be active in the small cell layer and in a DRX state in the macro cell layer.

FIG. 5 illustrates an example of a dual connected UE which may be in a DRX state on the macro cell layer and active in the small cell layer. The UE may have a RRC connection with the macro cell layer and may enter DRX on MeNB, while staying active on the SCeNB. Due to the highly directional nature of the mmW layer, the small-cell layer may be power efficient. Based on the data traffic that may be serviced by the macro-cell layer and the small-cell layer, it may be advantageous to invoke DRX in the macro-cell layer while being active on the mmW layer.

The UE may transition to DRX on the macro layer. The transition may be triggered due to an inactivity timer or a DRX command from the MeNB. The UE may use ultra-sleep mode on the macro layer, which may be larger than the long DRX cycle. The UE may send a DRX indication to the SCeNB. The DRX indication may convey to the SCeNB that it is going into DRX state on the macro layer. The small cell may monitor the macro control channel on behalf of the UE. The UE may provide to the SCeNB the macro configuration, e.g., RNTI used on the macro layer and information about primary cell (PCell) and configured secondary cells (SCells) in the macro layer. SCeNB may read the macro PDCCH on behalf of UE. SCeNB may indicate to the macro layer that it may be reading the UE control channels.

When the MeNB needs to wake up the UE for a downlink (DL) data arrival, the macro cell may: use a PDCCH command to signal the SCeNB to wake up the UE. The macro cell may use MAC CE (or higher layer signaling to SCeNB, e.g., the SCeNB may be using small cell specific RNTI). The macro cell may use other backhaul signaling methods to wake up the UE.

DRX wake up command on one layer may indicate that wake up may be needed on another layer. On receiving the DRX wake up command from the SCeNB, the UE may switch to traditional DRX cycle and may start monitoring MeNB PDCCH. When data transmission in SeNB is active, then DRX inactivity timer and/or DRX short cycle timer may be running in SeNB, but in MeNB, the UE may be in Long DRX. If SeNB (or MeNB) attempts to send, e.g., an RRC reconfiguration message to the UE, that message may be delayed due to MeNB Long DRX. To avoid this, a DRX wake up command from the small cell may be sent, so that UE would wake up and read MeNB PDCCH. For example, referring to FIG. 11, this may be useful in the control plane option C1 and data plane option 1A.

A dual connected UE may be in DRX state on the macro cell layer and on the small cell layer. The UE may enter this scenario from a pre-condition where the UE may be active on the macro cell layer and in DRX state on the small cell layer. The UE may enter this scenario from a pre-condition where the UE may be in DRX state in the macro cell layer and active in the small cell layer.

Figure 6:
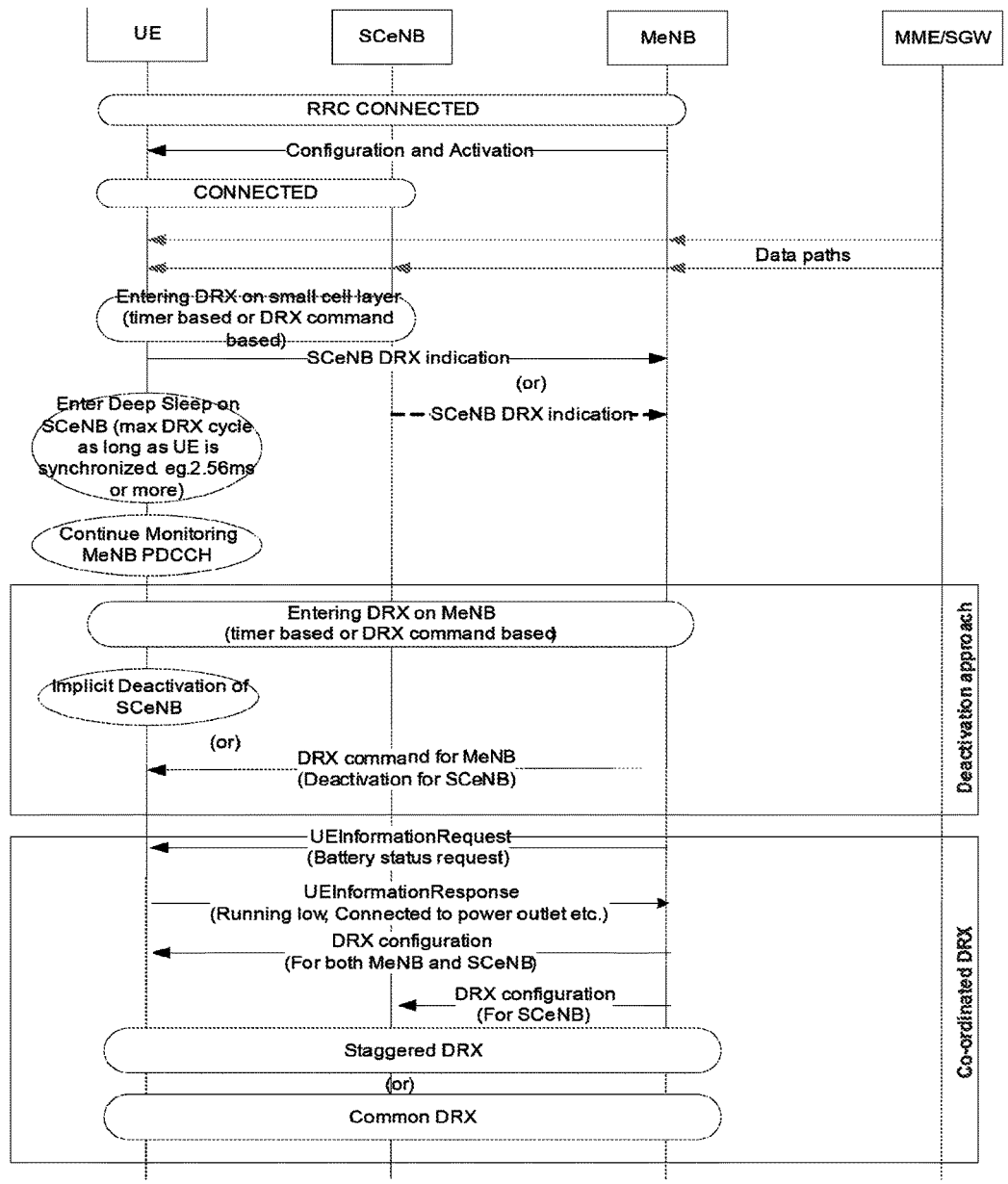
FIG. 6 is a diagram of an example message sequence chart where the UE may be in a DRX state in both the macro cell layer and in the small cell layer.

FIG. 6 illustrates an example where a dual connected UE may be in DRX state on the macro cell layer and the small cell layer. The UE may be in a pre-condition where the UE may be active on macro cell layer and in DRX state on the small cell layer. When the MeNB buffers data and the UE's UL buffers are empty, the UE may enter DRX on the macro layer. This may happen if the inactivity timers expire on the UE, or if the MeNB triggers the DRX state on the macro cell layer by sending a DRX command to the UE.

Where a network uses a deactivation based approach, the deactivation of the SCeNB may be implicit and may be triggered when the UE is in a DRX state on the macro cell layer. The MeNB may trigger implicit deactivation of the SCeNB. This may be, for example, configured during RRC connection setup at the macro cell. The macro eNB may send an explicit deactivation command for the SCells mapped to SCeNB.

In another deactivation based approach, the macro DRX state may be updated based on the SCeNB deactivation. The macro eNB may provide the UE with a DRX configuration (e.g., new DRX configuration) along with the small cell deactivation command. The UE may use the DRX parameters while monitoring the macro PDCCH. To save power, the UE may switch off the transceiver chain operating on the small cell layer. During this time, the UE may receive cross layer activation commands for the SCells mapped to the SCeNB from the MeNB PDCCH.

The network may configure coordinated DRX between the small cell layer and the macro cell layer. The MeNB may request the UE to provide the current battery status. The MeNB may use the UEInformationRequest message with a BatteryStatusReq information element (IE) added.

```
UEInformationRequest-v12x0-IEs ::= SEQUENCE {
    batteryStatusReq-r12    ENUMERATED    (true)
        OPTIONAL, -- Need ON
    nonCriticalExtension SEQUENCE { } OPTIONAL --
        Need OP
}
```

When the UE receives UEInformationRequest with BatteryStatusReq IE, the UE may provide the status of battery, e.g., below certain threshold, connected to power outlet, or charge above certain threshold. The mapping between the UE's internal battery condition to the IEs may be implementation dependent.

```
UEInformationResponse-v12x0-IEs ::= SEQUENCE {
    ueBatteryStatusReport-r12 CHOICE {
        Below-Threshold,
        Charging,
        Above-Threshold}
    }
}
```

The UE may trigger (e.g., autonomously trigger) the BatteryStatus indication as an implementation option to enable an efficient power save operation for the UE. The network may re-configure the connected mode DRX parameters and/or UE idle mode parameters (e.g., paging cycle). Depending on the UE battery status, the MeNB may select a staggered DRX or a common DRX configuration.

In a staggered DRX configuration, the MeNB may provide a DRX configuration such that the on-Duration in the macro layer and the small cell layer may not be overlapping. The UE may monitor the PDCCH in the macro and/or small cell layer at different times. Such a configuration, along with cross-layer wake up mechanism may result in better latency vs. power consumption performance.

In a common DRX configuration, the MeNB may provide the UE with a DRX configuration such that both macro layer and the small cell layer may have the overlapping On-Duration periods. Such a configuration may result in lower power consumption. After choosing the appropriate DRX parameters, the MeNB may configure the UE and the SCeNB with the DRX configuration.

Figure 7:
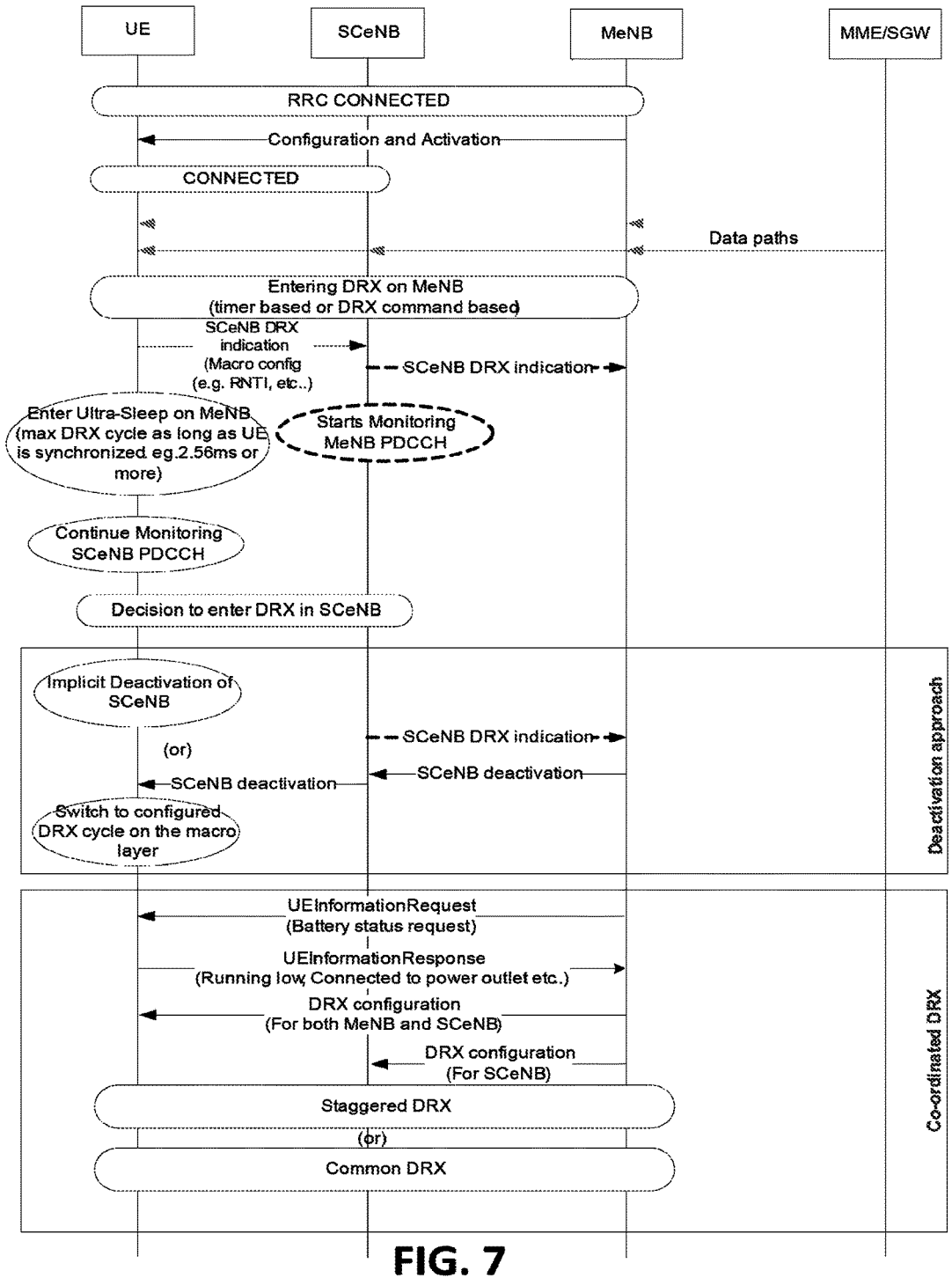
FIG. 7 is a diagram of an example message sequence chart where the UE may be in a DRX state in the macro cell layer and transitioning from active to DRX in the small cell layer.

FIG. 7 illustrates an example where a dual connected UE may be in DRX state on the macro cell layer and the small cell layer. The UE may be in a pre-condition where the UE may be in DRX state on the macro cell layer and active on the small cell layer. With the UE in DRX state on the macro cell layer, the UE may transition from active to DRX on the small cell. When the inactivity timers for the small cell layer on the UE expire, the UE may implicitly deactivate the SCells in the small cell layer.

The SCeNB may indicate the macro eNB that UE has transitioned to DRX state on the small cell layer. Macro eNB on receiving this indication and with the knowledge that UE is already in DRX on the macro layer, may trigger deactivation of the small cell layer. The macro eNB may configure coordinated DRX between macro and small cell layers. The coordinated DRX configuration may be similar to coordinated DRX configuration as described in FIG. 6.

Figure 8:
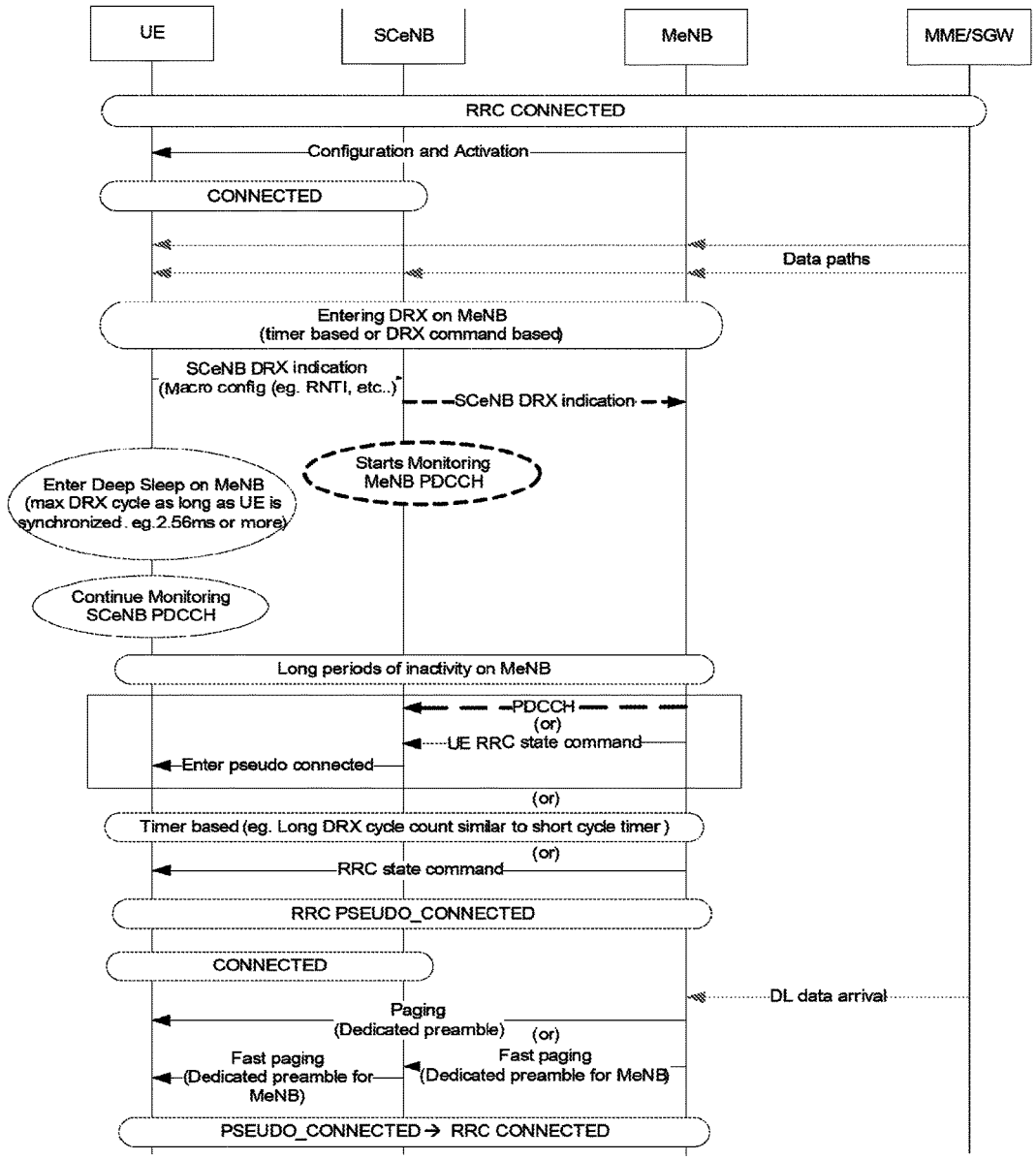
FIG. 8 is a diagram of an example message sequence chart where the UE may be in IDLE state in the macro cell layer and in CONNECTED state in the small cell layer.

FIG. 8 illustrates an example where a dual connected UE may be in idle state on the macro cell layer and in active state on the small cell layer. The UE may be in a pre-condition, where the UE may be in DRX state on the macro cell layer and active in the small cell layer. If the small cell is data offloading, the SCeNB may be used to serve the data intensive bearers for the UE.

For example, in case of a file download, the data radio bearers may be mapped on the small cell layer. The UE may be mapped to the high throughput bearers of the small cell, because the UE may be static (or moving with low speed) and/or the channel quality indication (CQI) of the small cell may be good. The UE may be active for extended periods for time on the small cell, which may imply that the UE may be in connected mode in the small cell longer than macro cell. To conserve UE battery, the MeNB may trigger the UE to use DRX on the macro layer.

Even though the UE may be in DRX mode, the radio resources allocated during RRC connection establishment on the macro layer may be reserved for the UE. The radio resources may include, for example, C-RNTI, CQI/scheduling request (SR)/acknowledgement (ACK)/non-Acknowledgement (NACK) on physical uplink control channel (PUCCH). The MeNB may release the radio resources allocated to the UE on the macro layer. The UE may move to RRC_IDLE state, when the radio resources are released on the macro layer. But in the context of dual connectivity, UE may be in connected mode on the small cell layer. This secondary connection to the small cell may be used to carry the signaling from the UE to the MeNB. The UE may have a shadow RRC connection to the macro layer, e.g., via the small cell. For the UE and the MeNB, this state of RRC may be different from the baseline RRC protocol states namely idle and connected. This state may be referred to as PSEUDO_CONNECTED state.

FIG. 8 depicts an example of signaling for the UE to enter RRC_CONNECTED to PSEUDO_CONNECTED mode on the MeNB and vice versa. The MeNB may detect that the UE is in DRX state on the macro cell layer for extended periods of time. The MeNB may send a trigger to the UE to move to PSEUDO_CONNECTED state. The MeNB may directly send a RRC state change command in the UE's paging channel. The MeNB may signal the RRC state change command via PDCCH signaling (e.g., by adding one bit to downlink control information (DCI) format IC). The MeNB may use a MAC Control element to signal the RRC state change command. The RRC state command may be signaled over the small cell layer (e.g., via RRC/MAC/PDCCH messages). This may use a transparent SRB mechanism, where the RRC messages from the macro cell layer may be forwarded from the SCeNB to the UE, e.g., via transparent containers.

On receiving a RRC state command from the MeNB, the UE may move to PSEUDO_CONNECTED state. The MeNB may configure an inactivity timer (e.g., based on number of long DRX cycles). When the timer is expired, the UE may (e.g., autonomously) move to PSEUDO_CONNECTED state. While in PSEUDO_CONNECTED state, the UE may move to connected state.

When the serving gateway (SGW) or the mobility management entity (MME) sends DL data for the UE, the MeNB may send a fast paging message to the UE on the configured paging channel on the macro layer. The fast paging message may include a dedicated RACH preamble that may include a dedicated random access channel (RACH) resource.

The fast paging message may be carried via the small cell using transparent SRB mechanism. In addition to the paging message, the small cell eNB may provide the UL timing assistance to the UE. The MeNB knowing that the UE may be in DRX on the macro layer, may forward the new DL data over the small cell layer, if multi-flow is configured. The SCeNB may update the status of the UE (e.g., DRX, active, deactivated) to macro eNB. On receiving the fast paging message, the UE may perform RACH and may move to RRC CONNECTED STATE on the macro layer.

While in PSEUDO_CONNECTED state, the UE may get the data from its higher layers to send on the UL to the macro eNB. The UE may trigger cross layer SR on the small cell layer to the macro layer. The UE may send a UL RRC state request message via transparent SRB via small cell eNB to the macro eNB. The macro eNB on receiving the request, may provide the UE a dedicated preamble, a dedicated RACH resource, using transparent RRC signaling, e.g., via small cell eNB.

In addition to the information provided by the macro eNB, the small cell eNB may provide additional UL timing assistance to the UE for the access on macro eNB. The timing assistance may be a timing offset of the small cell UL timing maintained at the UE. The UE may use the baseline procedures to move from PSEUDO_CONNECTED to CONNECTED state (e.g., procedures similar to RRC connection setup procedure).

The UE may be configured with multiple DRX groups. A DRX group may be a group of serving cells, which may be configured based on input parameters, such as frequency of operation of cell, expected traffic pattern, etc. A DRX group may be a group of cells configured within a layer, or across layers, that uses common (e.g., the same) DRX values. For example, cells that share the same RF chain may be configured to be part of the same DRX group, cells that will be used for similar types of traffic may be configured to be part of the same DRX group, or the multiple cells that support a single bearer (e.g. using DRB splitting as a part of user plane architecture 3C) may be configured to be part of same DRX group.

The UE may use the group DRX configuration to compute the common DRX cycle for the cells in the group. For example, when a cell from a DRX group is activated or deactivated, the UE may recompute the DRX parameters to be applied for the group. The DRX parameters may be computed taking into account each of the configured cells in the group (e.g., activated or deactivated). The DRX parameters may be computed taking into account activated cells in the group, and not other cells. An activation/deactivation command may trigger the UE to recompute the DRX cycle for the members of the group.

The DRX group may be configured using RRC or MAC signaling, or implicitly derived by the UE based on parameters such as, frequency of operation, traffic profile, and whether the cell is a special cell or primary cell. The DRX configuration may indicate several one or more parameters that are applicable for the cell or cells configured as a part of the DRX group. For example, DRX timers may be specified in terms of PDCCH subframes.

Configuration aspects may include one or more of the following: the cells or carriers that are a part of the DRX group; if the DRX group is defined per-layer, the cells in that layer are part of the defined DRX group; the frequency of carriers that should be part of the DRX group (e.g., the cells operating in a particular mmW layer may be part of the group); the DRX pattern to be used for the group. Each pattern configuration may be specified with a method in which the DRX pattern is to be derived for the UE.

In a staggered DRX configuration, the DRX configuration may provide that the On-Duration of the cells in the group are not overlapping. For example, when a single RF chain is shared between multiple cells on same or different layers, and DRX is used as a mechanism to enable TDM operation across members of the group, the UE may monitor the PDCCH of the group members and layers at different times. The UE may be provided with a list of cells/carriers which is ordered based on how staggering needs to be performed, thus indicating the DRX cycle for the group. When running DRX timers for the group, a subframe that is a PDCCH subframe of a single cell/carrier may be counted as a PDCCH subframe, sequentially starting from the first cell/carrier in the list to the next consecutive carrier, and so on. This may result in better latency vs. power consumption performance. This may be provided with a cross-layer wake up mechanism.

The UE may be provided a cell specific pattern for each cell in the group. The UE may be provided a base pattern for one member in the group (e.g., DRXOffset and DRX-CycleLength), and an offset value to apply to the base pattern, e.g., to deduce the pattern of the secondary members of the group.

In a common DRX configuration, the network entities involved as a part of the group may coordinate a common DRX configuration, and the UE may be provided with a DRX configuration such that the members have the same or overlapping DRX patterns. Such a configuration may result in lower power consumption. This may be achieved by configuring common longDRX cycle, DRXstartoffset, and the on-Duration parameters (e.g., even in case of SFN mismatch between the macro and the small cell). The longDRX and on-Duration periods of MeNB and SCeNB may be multiples of each other.

The UE may be provided with a DRX configuration by each cell separately. The UE may, or be instructed to, perform DRX using a union of the separate configurations. When determining DRX timers for the group, UE may consider PDCCH subframes from all the carriers in the group. The UE may determine an absence of UL/DL allocation if the PDCCH subframes from the carriers in the group indicate absence of allocation. The UE may determine a presence of UL/DL allocation if a PDCCH subframe from at least one carrier in the group indicates allocation.

A release (e.g., release 11) of third generation partnership project (3GPP) may provide two states for RRC protocol (e.g., idle state and connected state). While in idle state, the UE mobility may be tracked by the core network. The UE location may be known at the tracking area granularity. No UE context may be maintained at the radio access network level. On establishing SRB1, using RRC connection setup procedure, the UE may move to RRC connected state. While in RRC connected state, the UE location may be known at the serving cell granularity. The UE context may be maintained at the radio access network. The UE may move back to idle state due to RRC connection release procedure or due to radio link failure procedures, configuration failures, and the like.

In a case of dual connectivity, the UE may have two radio links, one to macro eNB and one to small cell eNB active. The dual connectivity may bring challenges and the existing RRC protocol states may need to be updated.

If the UE radio link to macro eNB is active, the UE may be in RRC CONNECTED state. This may be true in the case of dual connectivity as well. In dual connectivity, the secondary connection to a small cell may be treated as a subset of RRC_CONNECTED state on the macro cell (e.g., the macro RRC being the master).

In dual connectivity, the radio link to the small cell may be active, while the UE may be in idle on the macro layer. This scenario may occur when the bearers served by macro eNB are released or are inactive for long periods of time. The macro eNB may release the RRC connection on the macro layer to conserve the radio resources. In the baseline scenario, the release may be equivalent to UE moving to RRC_IDLE state. But in the case of dual connectivity, because the UE has an active radio link on the small cell layer, the UE's state on the macro cell layer may be different than baseline RRC_IDLE state. The radio link to the small cell may be seen as a shadow RRC connection to the macro eNB. This state of the UE on the macro cell layer may be referred to as a PSEUDO_CONNECTED state. The PSEUDO_CONNECTED state may be implemented as DRX with higher values possible (e.g., extended DRX configuration) within the RRC_CONNECTED state.

When in PSEUDO_CONNECTED state on the macro cell, the UE may perform one or more of the following. The UE may monitor a paging channel on the macro layer, for example, to detect incoming calls, system information change, for earthquake and tsunami warning system (ETWS) notification for ETWS capable UEs, commercial mobile alert system (CMAS) notification for CMAS capable UEs. The UE may acquire system information, when the system information changes on the macro cell. The system information updates on the macro cell may be provided to the UE, e.g., via dedicated signaling on the small cell layer. The UE may perform neighboring measurements on the macro cell layer. The UE may perform macro update procedure (e.g., UE triggered, network controlled mobility). The UE may monitor control channels on the small cell layer associated with the shared data channel to determine if data is scheduled for it. The UE may provide channel quality and feedback information about the neighbors in the small cell layer to the macro layer, e.g., via small cell layer. The UE may use cross-layer scheduling request to macro eNB, e.g., via SCeNB on data arrival from higher layers. The UE may receive fast paging message and use modified RACH procedure to trigger transition to RRC CONNECTED mode.

Figure 9:
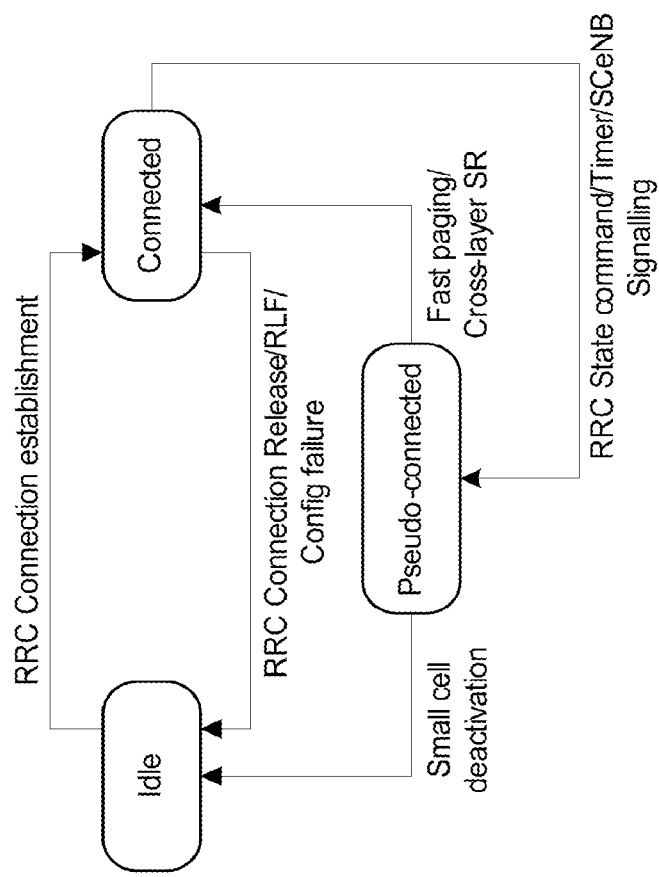
FIG. 9 is a diagram of an example of a resource radio control (RRC) state machine.

FIG. 9 illustrates an example of RRC states and triggers for transitions between those states. A UE on power up may start in IDLE state. After SRB1 establishment, the UE may move to RRC_CONNECTED state on the macro eNB. On receiving RRC connection release or due to radio link failures or other failure reasons (e.g., configuration failure), the UE may move to IDLE mode. While in RRC_CONNECTED state on the macro, the MeNB may configure the UE with the small cell resources.

In a case of dual connectivity, while in connected state in the small cell layer, the UE may transition to PSEUDO_CONNECTED state. The UE may receive a RRC state command from the macro eNB (e.g., via direct signaling, paging channel, or SCeNB transparent SRB). In local timer based transition, the timer may be configured by the macro eNB (e.g., during RRC connection setup or using RRC connection reconfiguration). The timer may be maintained both in the UE and in the macro eNB. The UE and macro eNB may be in sync with RRC states. MeNB may signal the SCeNB over the backhaul and the SCeNB may signal the UE, e.g., via PDCCH or MAC CE based signaling. Where SCeNB has a light RRC layer, the RRC state command for the macro may be generated using the small cell layer RRC signaling.

When in PSEUDO_CONNECTED state, if the UE receives paging message, e.g., via MeNB or fast paging via small cell eNB, the UE may transition to RRC_CONNECTED state on the macro eNB. The paging message may be same as the baseline with the addition of a dedicated RACH preamble (e.g., as part of MAC CE) or a separate IE in the paging message. The paging message may be triggered by the access network, and not the core network.

The UE may trigger the state transition from PSEUDO_CONNECTED to RRC_CONNECTED, for example, for higher layer data arriving at the UE. The UE may send a cross-layer scheduling request to the macro eNB, e.g., via the active small cell connection. The UE may send a UL RRC state change request to the macro eNB, e.g., via transparent SRB mechanism in the small cell. If each of the SCells from the small cell layer is deactivated, the UE may move to IDLE state on the macro layer.

A UE may be triggered to move to/from a PSEUDO_CONNECTED state. The UE may transition to or from the PSEUDO_CONNECTED state, e.g., based on one or more commands received from the network. For example, a MAC CE may be defined to move the UE out of extended DRX or PSEUDO_CONNECTED state in the other layer. The existing DRX MAC CE may be enhanced, for example with a bit indicator, to command the UE to move to normal DRX or extended DRX (PSEUDO_CONNECTED) state.

The UE may transition to or from the PSEUDO_CONNECTED state using configured timer values. For example, if a configured number of inactivity timers expire in a configured duration, the UE may transition into PSEUDO_CONNECTED state.

Figure 10:
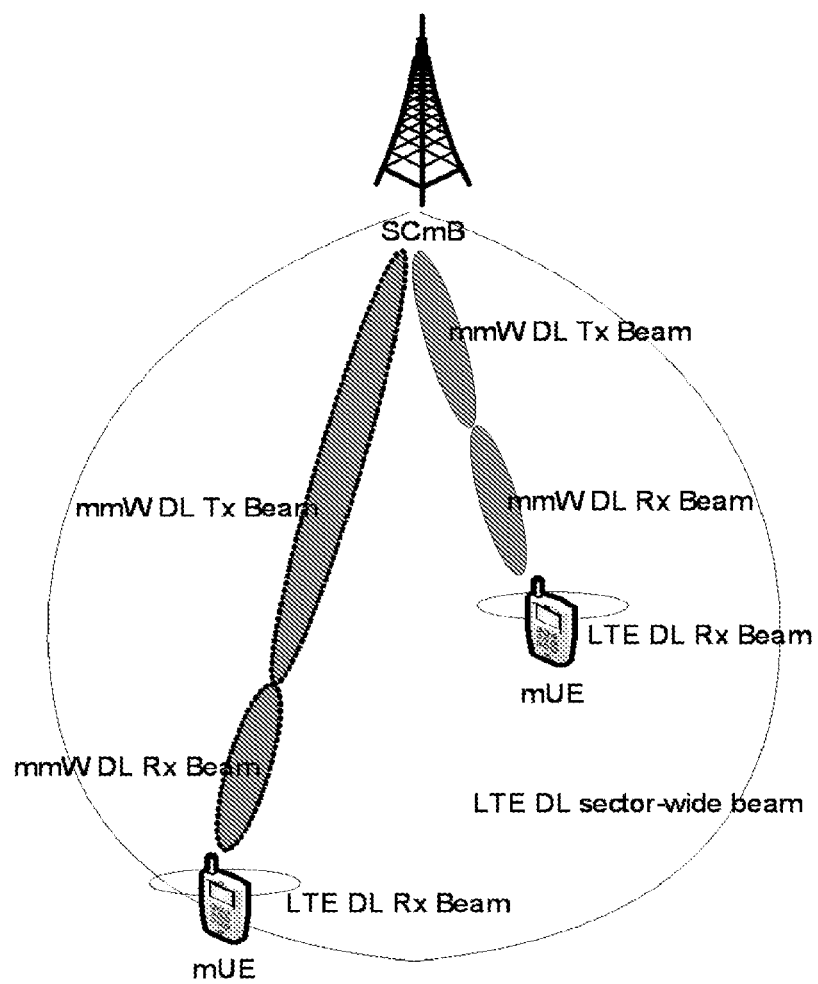
FIG. 10 is a diagram of an example of directional millimeter wavelength (mmW) transmission and omni-directional Long Term Evolution (LTE) reception.

FIG. 10 is an example of directional mmW transmission and omni-directional LTE reception. The large bandwidth available at mmW frequencies may provide capacity improvement for user-specific data transmission, but a narrow beam pattern may also pose challenges for a stand-alone mmW-only eNB solution, e.g., in delivering cell-specific/broadcast information.

The mmW operation may be performed by two network nodes—a Small Cell eNB (SCeNB) and a mmW UE (mUE). SCeNB may be an LTE small cell eNB capable of transmitting data on a mmW carrier in parallel with the LTE carrier in the downlink. The SCeNB may be equipped with advanced antenna configuration and associated beam forming technique. The SCeNB may simultaneously transmit LTE channels in a wide beam pattern and mmW channels in a narrow beam pattern. To support UEs without mmW transmitters, the SCmB may support a mode where the uplink operates using the LTE air interface and may support for example feedback for mmW carrier. A mUE may be an LTE UE capable of operating an mmW downlink air interface in parallel with the LTE air interface in the downlink. The mUE may have two sets of antennas and the associated RF chains, one operating on LTE band and the other in mmW frequency band. There may be two independent baseband processing functions. The baseband functions may share certain blocks if the mmW air interface bears similarity with the LTE system. The mmW HW/SW may be limited to a receiver implementation.

The add-on mmW channels may be an extension of the carrier aggregation scheme where the new carrier type is in the mmW frequency band, but applies a different air interface. The mmW channels maybe applied (e.g., only applied) for high-throughput and/or low-latency traffic data application. Control signaling, including system information update, paging, RRC and NAS signaling (e.g., signaling radio bearers) and multicast traffic, may be carried in LTE channels. Certain mmW control signaling may use LTE channels.

FIG. 10 illustrates exemplary mmW data enhancement. Due to the significant propagation loss, especially in NLOS at mmW frequency band, the SCmB and mUE may employ narrow beam forming in the Tx and Rx directions, which may ensure satisfactory link budget for high-throughput and low-latency traffic data. The SCmB and mUE may employ a wider beam pattern for traditional LTE operation, which may include cell search, random access, and/or cell selection/reselection. A R12 LTE UE may apply an omni-directional beam, e.g., 0 dBi in both Tx and Rx directions.

Figure 11:
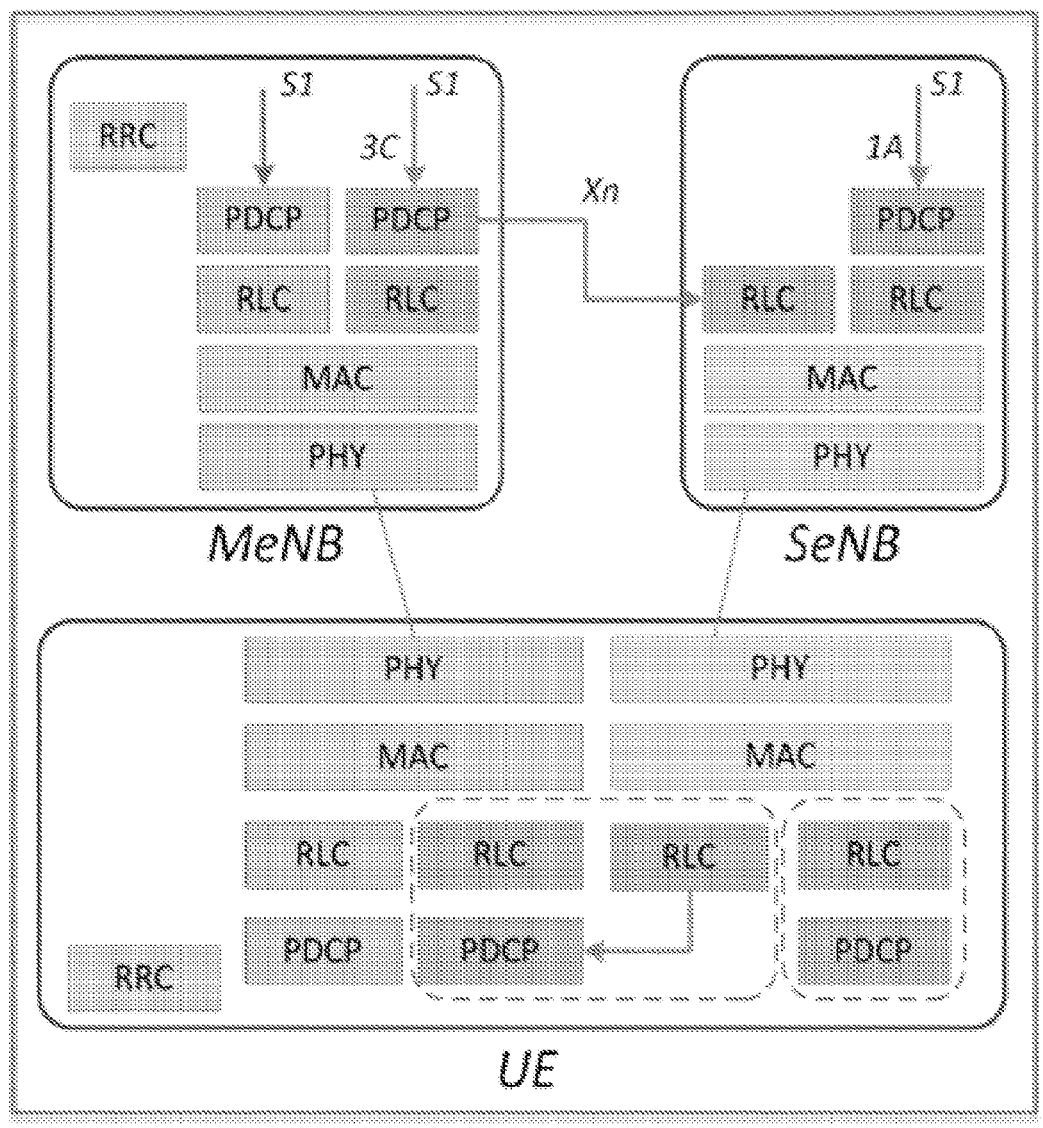
FIG. 11 is a diagram of an example of a Release 12 dual connectivity protocol architecture.

Turning to FIG. 11, a dual connectivity protocol architecture (e.g., for Release 12 dual connectivity) is depicted for MeNB, SCeNB and the UE. The mmW DRX solution may be provided by Release 12 dual connectivity architecture. C1, 3C, 1A may be provided as baseline examples for control and user plane architecture respectively. In C1, RRC terminates in the macro eNB and the L2 transport for SRBs may be made using macro eNB resources. 3C is with S1-U termination at the macro eNB and bearer split and independent RLCs. 1A is with S1-U termination at small cell and independent PDCPs and no bearer split. Xn interface between macro and small cells may be assumed to be non-ideal.

Figure 12:
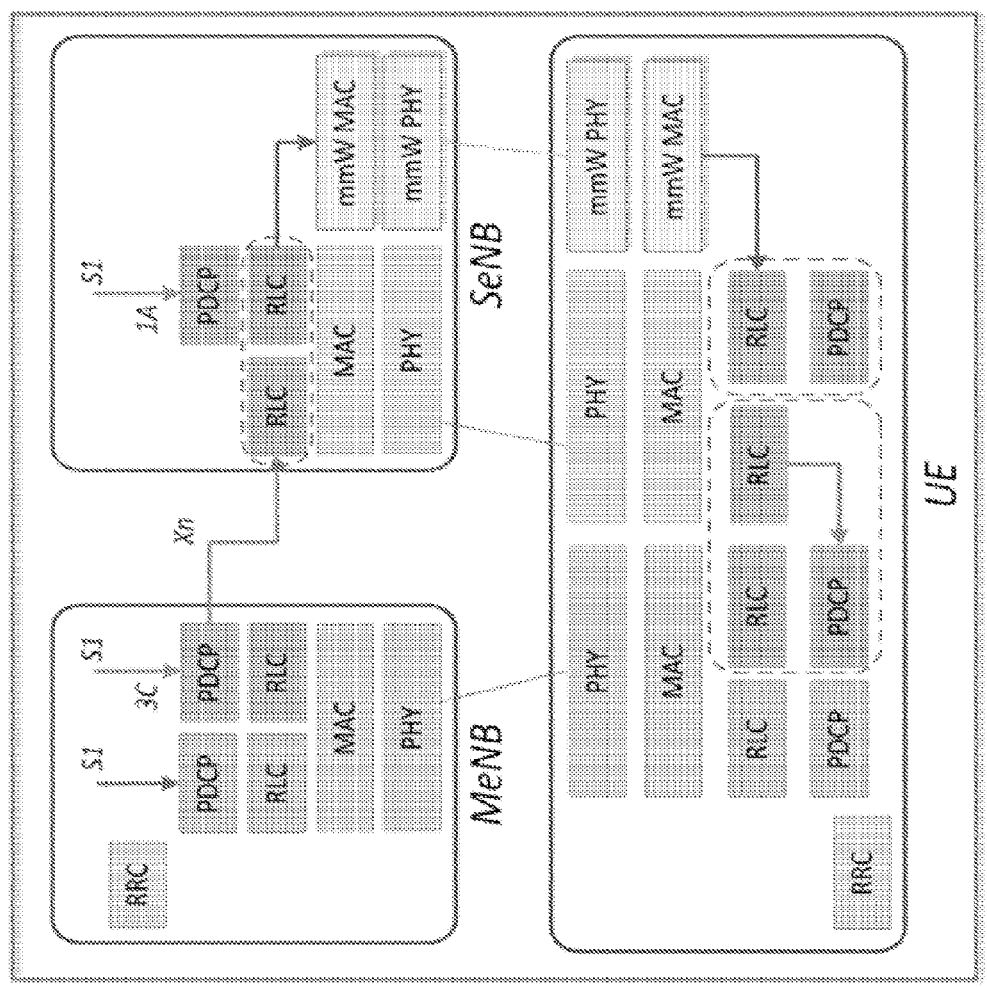
FIG. 12 is a diagram of an example of co-located mmW protocol architecture.

FIG. 12 is a diagram of co-located mmW protocol architecture. In a plugin approach, the mmW DL carrier may be added to the small cell site. The small cell now has one or more LTE CC and at least one mmW CC. The LTE CC may be used for control, system info, mobility control and coverage. The mmW CC may be considered as a data pipe, e.g., for throughput enhancement.

3GPP small cell study recognizes that mobility may be an issue even with LTE small cells and signaling load due to frequent HOs in the small cells. mmW implementations may lack omni-directional coverage and the mmW directional links might have intermittent losses due to blockage, user mobility, and/or user orientation. The mmW carrier may be used a secondary carrier for data. This may be slightly different from a carrier aggregation framework, in that the mmW TTIs may be shorter than LTE TTIs (10s of mmW TTIs within LTE TTI) and the directional nature of the mmW (e.g., absence of omni-directional transmission in mmW carrier) may mean that UEs are time division multiplexed in the mmW CC. The mmW layer MAC may be different from an LTE MAC.

A protocol architecture (e.g., new protocol architecture) for mmW may be built on top of dual connectivity protocol architecture. LTE RLC protocol (e.g., segmentation, concantenation, re-segmentation, status report) may be re-used for mmW data path. One LTE RLC logical channel may map to multiple transport channels. The SAP between LTE RLC and mmW MAC may be RLC PDUs. RLC may re-transmit RLC PDUs on mmW that were originally transmitted on the LTE layer and vice versa. The UL feedback for mmW may be carried by LTE UL channels. UE MAC may receive the mmW transport blocks on the mmW carrier and send to RLC. LTE RLC may perform concatenation, re-assembly operation.

Figure 13:
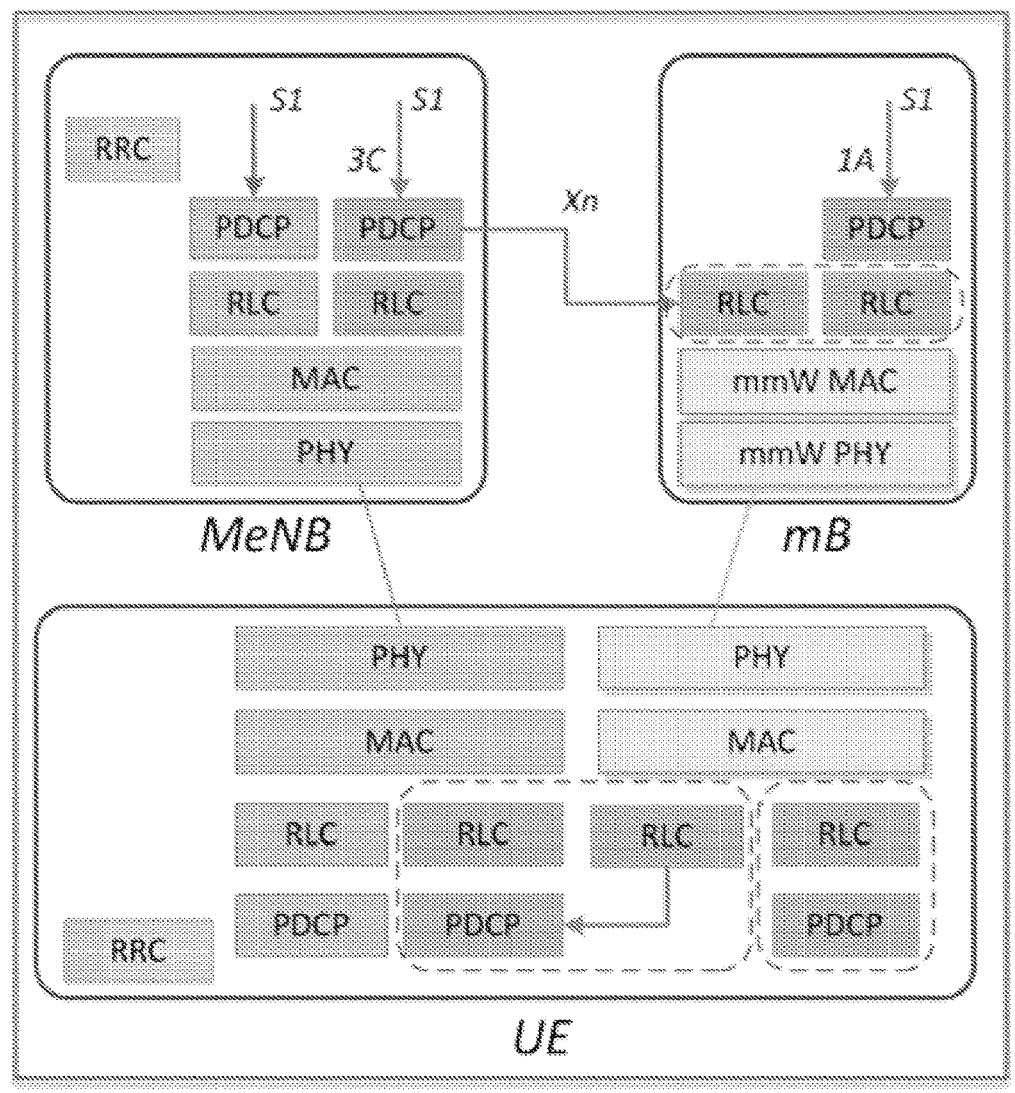
FIG. 13 is a diagram of an example of a dual layer LTE and mmW (non co-located) protocol architecture.

FIG. 13 is an example of a dual layer LTE and mmW non-colocated protocol architecture for stand-alone mB in a dual connectivity architecture. The small cells may be limited to carrying the mmW carrier; the small cells may be stand-alone mB (mmW Base-station).

Figure 14:
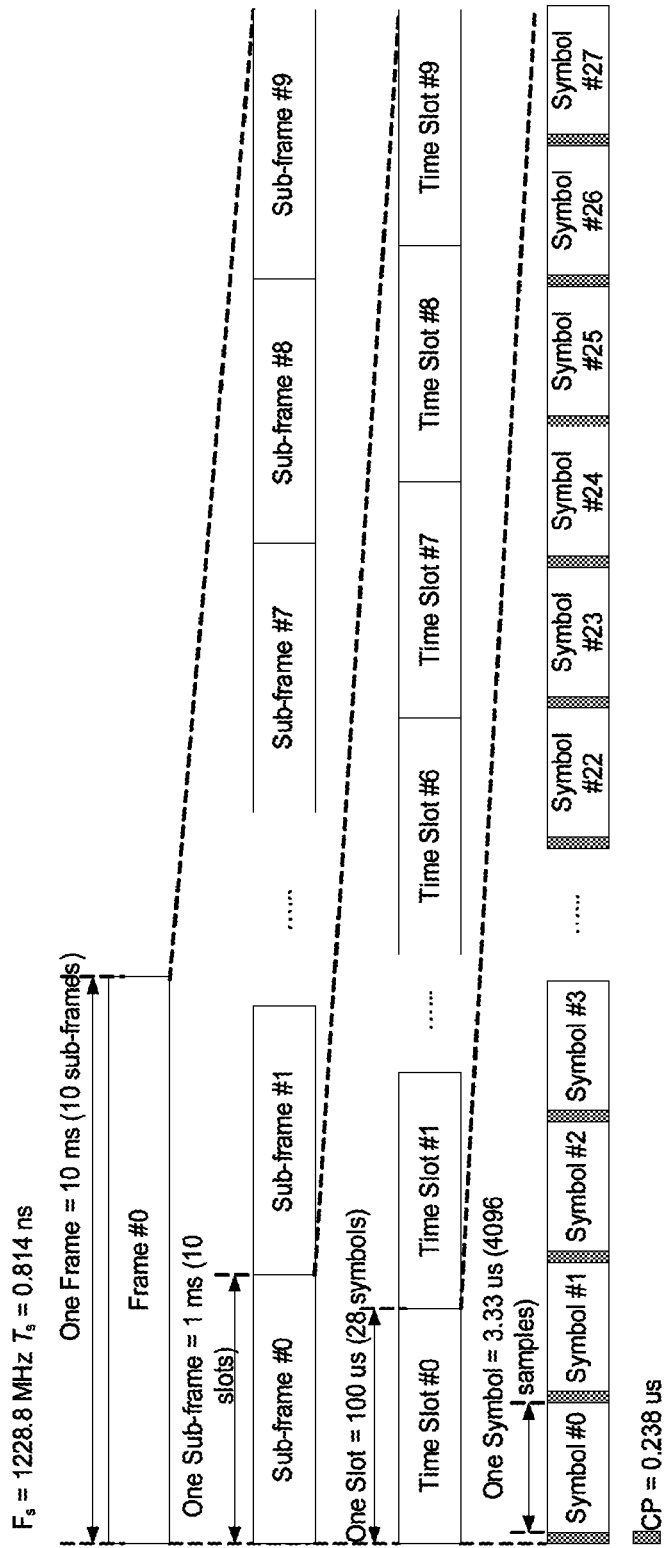
FIG. 14 is a diagram of an example of a frame structure for mmW.

Turning to FIG. 14, an example frame structure with short CP is depicted. Apart from high throughput applications, mmW carrier may support ultra-low latency applications. Some applications like virtual reality, augmented reality, tactile internet, and the like, require latencies <1 ms. The end-to-end user plane latency requirement of 1 ms may require a Round-Trip-Delay (RTT) time of 0.1 ms. Each time slot may have its own control region. The control region may be pre-defined, or for example, a first few symbols of the time slot could be dynamic. The choice of beams to use for each of the control symbols may be different, for example, mmW wide beam for sector level control and mmW narrow beam for UE level control.

In a mmW co-located scenario, the downlink control information (DCI) for mmW PDSCH may be signaled using one or more of the following: LTE PDCCH or ePDCCH; LTE PDSCH; a defined (e.g., new) LTE control channel; mmW PDCCH (e.g., narrow or wide beam); LTE RRC signaling; and/or LTE MAC CE. Assumptions on the mmW carrier may include that mmW TTIs are much shorter than LTE TTI; multiple mmW TTIs per LTE TTI; and in each mmW TTI, UEs may be time division multiplexed on the control channel and data channel.

DRX on the small cell layer are described. A co-located LTE carrier in the SCeNB may provide control signaling assistance for the mmW carrier. mmW DCI information (e.g., mmW DL control beam id, mmW slot assignment) may be provided by the LTE PDCCH. This assistance information may be provided less frequently (e.g., not every LTE TTI). The mmW assistance information provided by the LTE PDCCH may affect the UE DRX timers defined for the LTE carrier. UE active times might wake-up more than necessary, which may result in sub-optimal power savings at the UE.

A transparent mmW-RNTI or mmW DCI on the LTE carrier may be used. The mmW control information on the LTE carrier may be carried with a separate RNTI (mmW-RNTI) or may be carried with the LTE C-RNTI using a DCI message format (e.g., a new format) for mmW (mmW DCI). A UE, on receiving a PDCCH with mmW-RNTI or a mmW DCI, may not restart the DRX inactivity timer.

A pre-defined mmW on-Duration on the LTE carrier may be used. Transparent mmW-RNTI or mmW DCI approach may be provided during LTE on-Duration. On-duration specific for mmW reception could be configured. This on-Duration may be specific to mmW, and may be used to receive mmW control assistance. There may be no inactivity timer associated with mmW assistance on the LTE carrier. The mmW on-Duration may be chosen based on the UE mobility or the UE activity on the mmW carrier. LTE on-Duration may be multiples of mmW on-Duration, which may optimize the UE sleep times.

UE may receive a DRX command for the mmW carrier on the LTE carrier, for example, using LTE C-RNTI with a defined LCID (e.g., a new LCID) indicating mmW DRX command, or using mmW-RNTI with the LCID indicating mmW DRX command. Upon receiving the mmW DRX command on the LTE carrier, the UE may stop reception on the mmW carrier and stop the on-Duration and the inactivity timer for the mmW carrier.

The UE may monitor triggers on the small cell layer to perform wake-up decisions on the macro layer. The UE may monitor the PDCP sequence number for the bearers mapped to the small cell. The UE may be configured with an offset value from the PDCP sequence number wrap around point. The offset value may be configured such that the macro eNB may trigger key change on-the-fly for the specific UE. If the UE is currently in DRX mode on the macro eNB, and if the PDCP sequence number of any bearer mapped to the small cell reaches the configured offset value, then the UE may move to non-DRX mode on the macro layer to receive the intra-eNB handover command. The UE may transmit an UL message to the macro eNB that indicates the qualifying event on the small cell layer (e.g., PDCP sequence number wrap). The UL message may correspond to an RRC message defined to notify the macro eNB and trigger an intra-eNB handover for the key change on the fly. The small cell eNB may notify the macro eNB of the PDCP sequence number wrap and may transmit a wakeup command (e.g., for the macro layer) to the UE; this may be used in relation to user plane 1A. The UE may use a MAC Control element/PUCCH code point for notifying the macro eNB.

Measurement or monitoring activity on the macro layer may be triggered by events in the small cell layer. If the small cell layer is active, the UE in a dual connectivity mode may use relaxed measurement rules on the macro layer to enable longer sleep cycles for the UE on the macro layer, which may result in power efficient operation. The UE may dynamically switch to tighter measurement rules (measuring more often for example, or may scale the measurement parameters accordingly), based on the triggers from small cell activity. The UE may autonomously switch to shorter DRX cycles on the macro layer, e.g., depending on the triggering events in the small cell layer. Examples of triggers in the small cell layer may include at least one or more of the following criteria: the serving mmW control/data beam used in the mmW small cell layer is updated/modified, or updated/modified more than a configured value, or to a specific subset of beams; the UE discovers one or more new small cells in the small cell layer; the neighboring mmW control/data beam measured in the mmW small cell layer is more than configured threshold and/or updated to a neighbor mB specific subset of beams; the quality of the small cell link goes above or below a configured threshold; the quality of the neighboring small cell link goes above or below a configure threshold; the number of HARQ/RLC retransmissions in the small cell is more than the predefined threshold; the CQI of the small cell layer is above or below a configured threshold; or the data throughput measured at the small cell MAC layer is below a configured threshold.

UE behavior on the LTE UL due to mmW DRX may be disclosed. This may include mmW ACK/NACK using RACH on the LTE carrier and/or mmW DRX cycle with beam ID feedback on LTE UL.

During periods of DRX on the LTE carrier, the UE may go out of sync on the LTE uplink. In co-located mmW DL reception, the UE may be required to send ACK/NACK feedback to the SCeNB on the LTE UL. The SCeNB may provide dedicated RACH resources (e.g., specific RB configuration) to the UE to provide ACK/NACK feedback for mmW DL transmission. The UE may indicate the ACK/NACK by the choice of RACH preamble. The SCeNB may preconfigure the mapping between the RACH preamble to the ACK/NACK bitmap. Multiple bits of ACK/NACK corresponding to multiple mmW TTIs may be mapped to specific RACH preamble. The UE may indicate the ACK/NACK by the choice of RACH resource (e.g., subbands) used for transmission. The UE may use a combination of RACH preamble and the RACH resource to indicate the ACK/NACK status of the mmW DL transmission.

Figure 15:
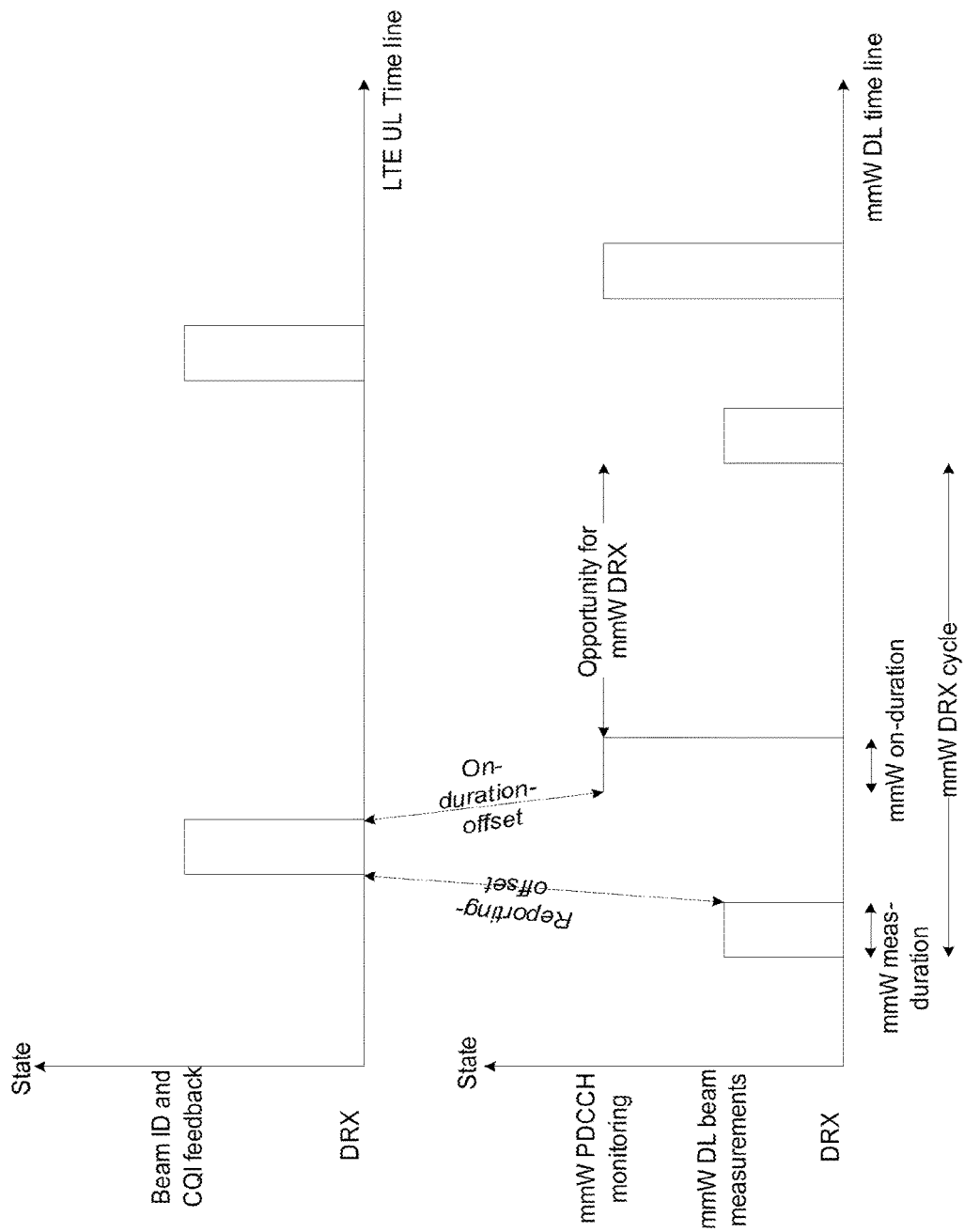
FIG. 15 is a diagram of an example of mmW DRX with beam ID reporting.

FIG. 15 is an example of mmW DRX with beam ID reporting. Directional mmW transmission may indicate that the mB should be up to date with the preferred DL beam ID for the UE. For mmW DRX, it may be beneficial, e.g., from the UE point of view, to update the network with the preferred DL beam to use. The beam ID feedback may be integrated into the mmW DRX cycle. For example, a UE specific DRX cycle may be defined that includes a mmW measurement resource, a reporting resource on the LTE carrier, followed by the mmW on-Duration. For example, a UE specific DRX cycle may be specified by configuring mmW on-Duration such that mmW on-Duration may be preceded by one or more mmW measurement resources followed by a reporting resource, for example, on the LTE carrier. The resource may refer to a combination of one or more time domain/frequency domain/code domain/beam (or) spatial domain resources.

The UE may be configured with LTE UL resources for mmW DL beam ID and CQI feedback. These configured resources may be on PUCCH resource or a persistent PDSCH resource. PUCCH resources may be assigned separately for mmW beam ID and mmW CQI feedback. The mmW measurement resources may be configured such that the UL LTE resources are aligned to the mmW on-Duration. SCeNB may configure the UL LTE resources with a specified offset from the mmW measurement duration, which may be set as one or more mmW timeslots during which the SCeNB may transmit one or more measurement pilots in the general direction (e.g., sector) of the UE. The SCeNB may configure the mmW on-Duration with a specific offset from UL LTE reporting resources.

The mmW DRX cycle may be defined as a periodic repetition of meas-duration and mmW-on-Duration configured by 5-tuples mmW-meas-duration, report-offset, LTE reporting resource, on-Duration-offset, and mmW-on-Duration.

UE DRX behavior on the mmW DL may be disclosed. In mmW DL, power saving may include one or more of the following: Micro-sleep (e.g., receive a portion (e.g., only a portion) of control region due to the directional and TDM nature of mmW transmission); Light-sleep (e.g., sleep during the data part of the subframe, e.g., if the mmW PDCCH indicates no allocation); Long-sleep (e.g., monitor the subset (e.g., only the subset) of mmW subframes or PDCCH in mmW subframes infrequently); Deep-sleep (e.g., enable deep sleep in the mmW layer with the assistance of overlay LTE layer (possibly from a different site)).

A UE with an active mmW CC may be configured by RRC signaling with the DRX functionality that controls the UE's monitoring activity for the UE's mmW-RNTI. If mmW DRX is configured, the UE may be allowed to read the mmW subframes discontinuously according the configured DRX set. mB may provide the UE with RRC configuration with at least one of the following parameters: DRX set; mmW on-Duration; and/or mmW-inactivity timer.

DRX set specifies one or more mmW resources monitored by the UE when on-Duration timer is running. The granularity of these mmW resources may be subframes or timeslots (e.g., beams) in the time domain and/or RBs within those resources for the frequency domain. For example, the UE may be configured with two DRX sets, one may be a full DRX set and the other may be a partial DRX set (e.g., having a smaller number of resources compared to full DRX set). A partial DRX set may be chosen such that the mmW resources in the partial DRX set is a subset of mmW resource configured by a full DRX set. A Non-DRX set may be defined (e.g., each of the mmW resources in the time domain that the UE may monitor for mmW allocation, for example when in non-DRX or continuous reception mode).

mmW on-Duration may specify the number of consecutive DRX sets(s) at the beginning of the DRX cycle. The duration may be configured to be different for different DRX sets. When the mmW-on-Duration timer is running, the UE may monitor the mmW resources (e.g., only the mmW resources) corresponding to configured DRX sets for mmW allocation. The UE may be configured to monitor the partial DRX set (e.g., only the partial DRX set) when the on-Duration timer is running.

mmW-inactivity timer may specify the number of consecutive DRX sets(s) after the mmW resource comprising the mmW allocation is received in the current DRX set. The inactivity timer may be configured to be different for different DRX sets. The UE may be configured to monitor the full DRX set when the inactivity timer is running. The UE may be configured to monitor the full DRX set when inactivity timer is started, and then transition to a partial DRX set until the inactivity timer expires.

In one option the DRX set may be configured by RRC signaling and an example configuration is provided below:

```
DRX-Config ::= CHOICE {
    release                NULL,
    setup                  SEQUENCE {
        non-DRX-set            SEQUENCE {
            nD-onDurationTimer     ENUMERATED {
                                       psf1, psf2, psf3, psf4,
psf5, psf6,
                                       psf8, .......... . . },
            nD-InactivityTimer     ENUMERATED {
                                       psf1, psf2, psf3, psf4,
psf5, psf6,
                                       psf8, .......... . . },
        }
        Full-DRX-set           SEQUENCE {
            fD-resourceConfig      mmW-monitor-resourceList,
            fD-onDurationTimer     ENUMERATED {
                                       psf1, psf2, psf3, psf4,
psf5, psf6,
                                       psf8, .......... . . },
            fD-InactivityTimer     ENUMERATED {
                                       psf1, psf2, psf3, psf4,
```

```
                psf5, psf6,
                                            psf8, .......... . . },
                    }
            Partial-DRX-set             SEQUENCE {
                pD-resourceConfig           mmW-monitor-resourceList,
                pD-onDurationTimer          ENUMERATED {
                                            psf1, psf2, psf3, psf4,
psf5, psf6,
                                            psf8, .......... . . },
                pD-InactivityTimer          ENUMERATED {
                                            psf1, psf2, psf3, psf4,
psf5, psf6,
                                            psf8, .......... . . },
            }
        }
}
mmW-monitor-resouceList ::= SEQUENCE(SIZE(1..maxResource)) OF mmW-
Resource
mmW-Resource         ::=  SEQUENCE {
    mmW-DRX-cyle                ENUMERATED {
                                sf2, sf5, sf8, sf10, sf16, sf20,
                                .........},
    mmW-DRX-offset              INTEGER (0..9)
}
```

Figure 16:
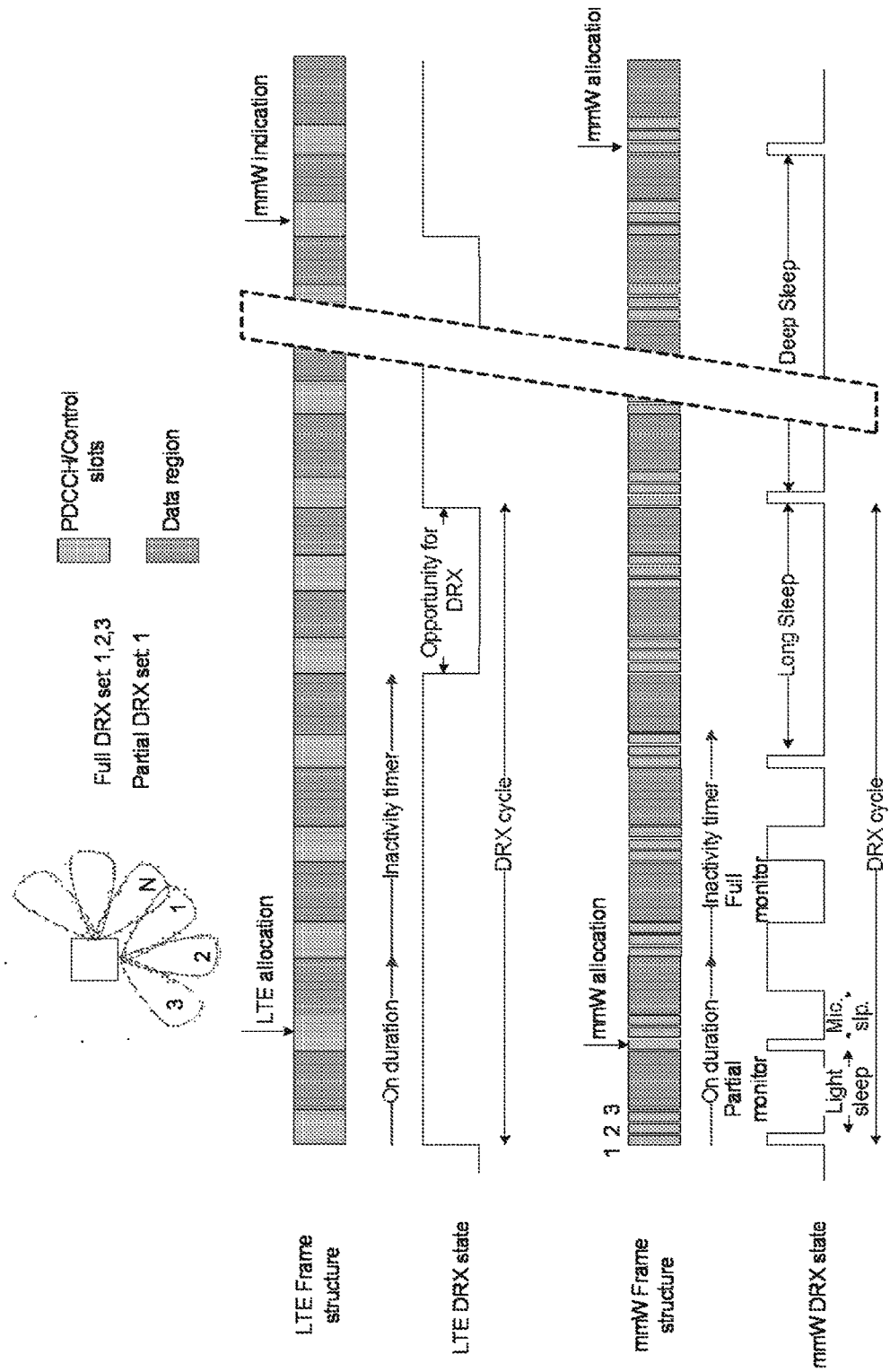
FIG. 16 is a diagram of an example of mmW DRX with LTE.

FIG. 16 is an example of interworking between LTE and mmW DRX. The transition from non-DRX, full monitoring, and partial DRX monitoring set may be dynamic and may follow one or more of the following.

The mmW monitoring resource sets (e.g., full and partial) may be configured by RRC signaling and the transition may be explicit and may be triggered by the mB using a MAC CE (e.g., a new MAC CE) on the mmW DL or using a mmW PDCCH code point. The explicit transition command may be signaled in one of the monitoring resources according the current UE DRX set configuration. The explicit transition command may signal the UE to move from full to partial, or vice versa.

The transition may be implicit and may be based on timer/counter for each DRX set. For example, mB may configure the UE with a full-DRX timer/counter similar to inactivity timer, e.g., three sets of inactivity timers could be defined: transition from non-DRX to full-DRX, transition from full-DRX to partial-DRX, and transition from partial-DRX to non-DRX. The on-Duration for each set may be defined separately. mB may configure the mmW DRX such that the active time in LTE and mmW are aligned to increase the power saving efficiency.

The mmW DRX set may be updated using MAC/PDCCH signaling. mB may use a mmW MAC CE or mmW PDCCH signaling, which may be new, to add or remove resources to the mmW DRX sets (e.g., to full and partial DRX sets). The mmW DRX resources may be reconfigured by LTE MAC CE/PDCCH signaling. Such resource reconfiguration may be triggered due to DL data arrival or UE mobility (for example, UE mobility may alter the active DL control beam for the UE, and in turn, affect the subframe monitored by the UE). The mmW DRX set timers may be reconfigured dynamically using MAC CE or PDCCH signaling.

Handling of mmW DRX de-sync between the UE and the network may be disclosed. If DRX de-sync occurs between the UE and the network, the mB may choose the mmW resources corresponding to the partial mmW monitoring set to signal a particular DRX set to the UE, e.g., to ensure the fact that the UE monitors at least a partial DRX monitoring set irrespective of the DRX configuration. If the UE cannot receive the partial mmW monitoring set reliably, e.g., due to mobility or sudden change in UE orientation or sudden blockage, the mB may use LTE PDCCH signaling to reset the mmW DRX set (e.g., commanding the UE to transition to a mmW non-DRX mode, for example) and re-establish the DRX synchronization between UE and mB.

Figure 17:
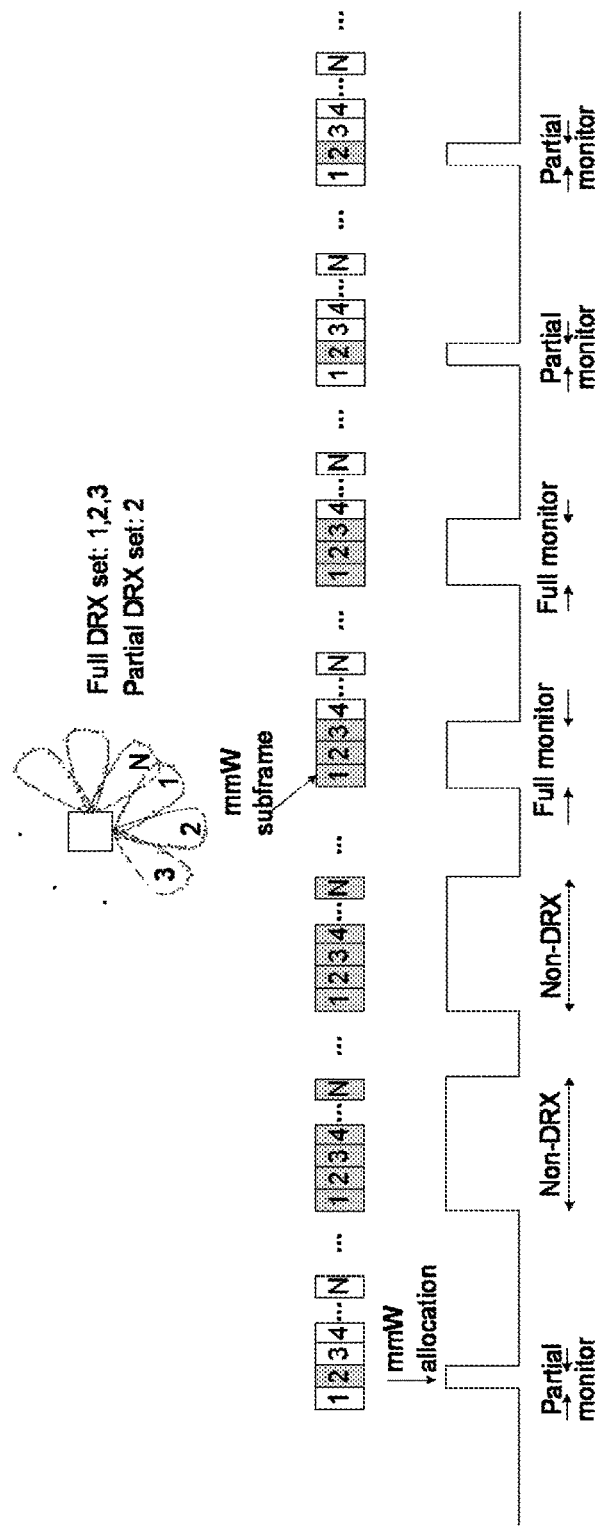
FIG. 17 is a diagram of an example of mmW subframe level DRX sets.

FIG. 17 is an example of mmW subframe level DRX sets. DRX sets may have different granularity. For example, the granularity of the DRX sets may be subframe level. This is may be useful in flexible or floating control region, e.g., control slot position in the mmW subframe is not fixed and may be floating or mixed with the data slots. The configuration of control slots may be dynamic and may vary each subframe. The UE may monitor the whole subframe for control slot indication. The mmW DRX disclosed above may be extended by configuring the DRX sets in granularity of subframes.

UE may be configured with partial DRX set of subframe number 2 as depicted in FIG. 17. The full DRX set may be configured to include each of the subframes. When the on-Duration is running, the UE may be limited to monitoring the partial subset (e.g., only subframe number 2). Upon receiving mmW allocation, the inactivity timer may be started and the UE may switch to full monitor and receive each of the subframes and checks for mmW allocation.

mmW DRX sets may be configured at the control slot granularity. The following rule may be apply:

number of control symbols per time slot<=number of control beams in the cell*number of control symbols per beam The number of control symbols per time slot may depend on the UE distribution in the small cell. Unlike LTE, due to the directional nature of transmission, the UE may not receive all the mmW control symbols for a time slot. mmW DL may have variable control region. The UE may be configured with a dedicated control symbol number in each time slot, or the control symbol number may change according to a specific pattern in each time slot. The dedicated control symbol number may be configured to the UE using RRC signaling.

The dedicated control slot number may be updated by LTE MAC CE or LTE PDCCH at the granularity of LTE TTI. The UE may be configured to monitor multiple control symbols every time slot. DRX may be defined where the UE monitors different sets of control symbols depending on whether the on-Duration timer or inactivity timer is running.

The UE may monitor the configured control symbol when the on-Duration timer is running. When mmW allocation is received in the configured control symbol, the UE may start or re-start the inactivity timer. When the inactivity timer is running, the UE may monitor each of the control symbols or a subset of configured control symbols for mmW DCI. When the inactivity timer expires, the UE may fallback to monitoring the configured control symbol. Such an approach provides flexibility to the SCeNB mmW scheduler, such that the active UEs may be scheduled in any control symbol and the UEs in DRX may be awakened by scheduling in the corresponding pre-defined control symbol.

Figure 18:
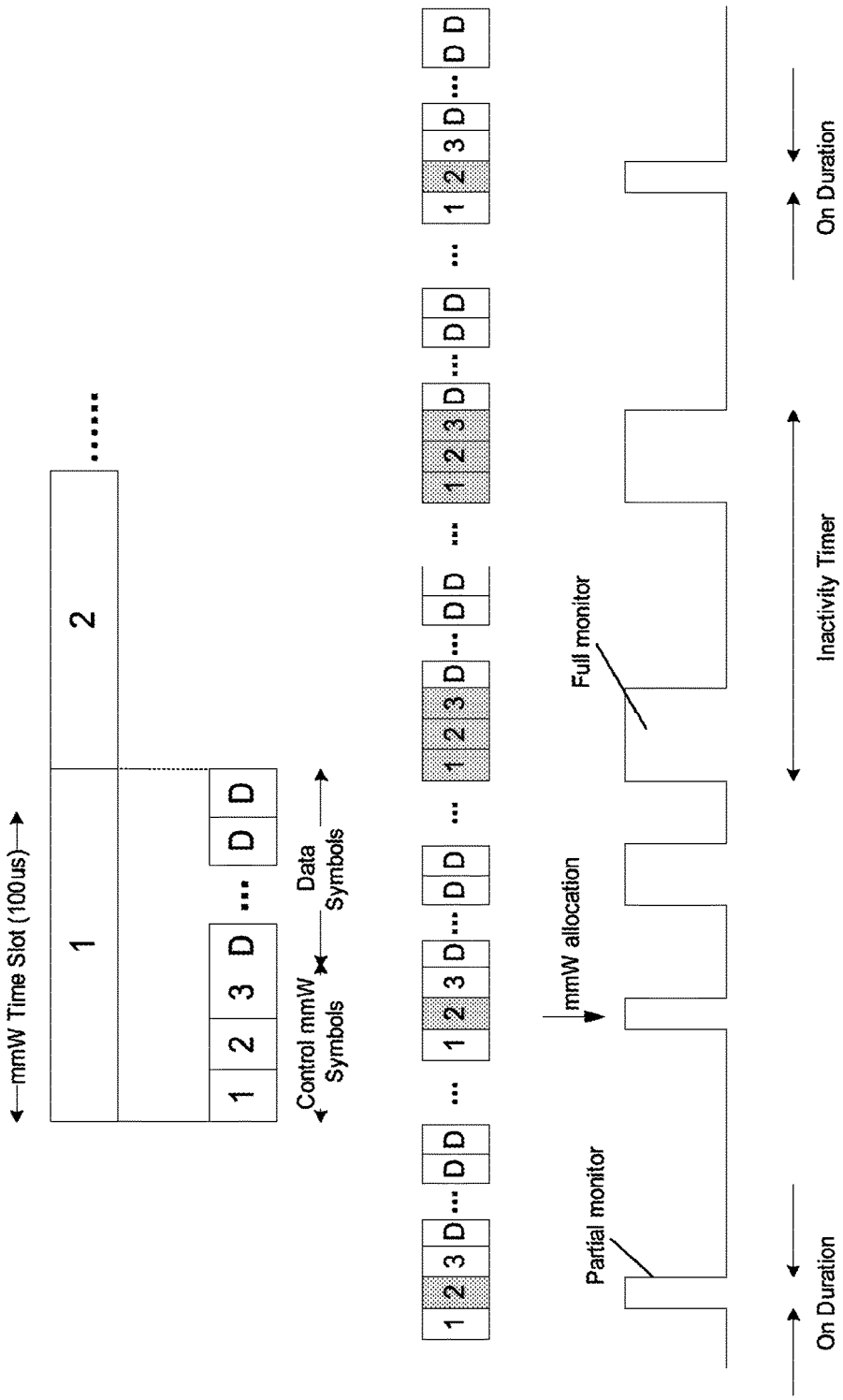
FIG. 18 is a diagram of an example of mmW control slot level DRX sets.

FIG. 18 is an example of mmW control slot level DRX sets, depicting a fixed control region of three symbols (1, 2, 3) and the transition between full and partial monitoring states according to the on-Duration and inactivity timer status.

To coordinate mmW DRX configuration and Beam Forming Reference Signal (BFRS), a SCeNB supporting mmW DL carrier may transmit a mmW Beam Forming Reference Signal (MBFRS). UEs in RRC_CONNECTED mode may be configured to receive subset of MBFRS. The subset of MBFRS may be determined based on the UE location in the small cell. SCeNB may limit the transmission of MBFRS in the sectors where the active UEs are located.

SCeNB may configure reporting resources for the UEs receiving MBFRS. The periodicity of the reporting resources may be configured depending on periodicity of the MBFRS and the mobility of the UE. The mobility may include UE speed and/or rate of UE orientation change, such as by an accelerometer/gyroscope and/or digital compass. The UE may be configured to transmit a preferred mmW DL beam information using the reporting resource. The SCeNB may configure a DRX cycle for a UE such that MBFRS and the reporting resources are aligned to the DRX cycle of the UE and the UE is able to measure and report the preferred DL Tx beam to the network before the mmW on-Duration.

In case of a co-located LTE+mmW carrier at the SCeNB, the UE may use LTE UL channels to transmit mmW feedback information. A UE may follow independent DRX cycles on the LTE and mmW carrier. During the periods when the UE is out of sync on the UL, mmW ACK/NACK information may be transmitted using the LTE UL carrier. The SCeNB may configure the UE with a set of pre-defined mapping between the LTE UL RACH resource and the mmW feedback value.

The LTE UL RACH resource may include one or more of RACH preambles, RACH format, frequency resource (RBs), time resource (Subframe config), and the like. The mmW feedback value may include ACK/NACK information for one or more mmW subframes. The mmW feedback value may include ACK/NACK bundling configuration, the CQI, and/or the mmW beamID information. The UE may determine the appropriate mmW feedback and particular RACH resource on the LTE carrier based on the pre-defined mapping configured by the SCeNB. The UE may perform implicit activation/deactivation of these pre-configured RACH resources based on the status of time alignment timer. For example, upon expiry of the time alignment timer, the UE may consider these pre-configured RACH resources active. The uplink RACH may carry implicit mmW feedback (ACK/NACK, CQI, and Beam ID). The uplink RACH may also provide UL synchronization for the UE to transmit subsequent mmW feedback using LTE PUCCH.

Methods for beam recovery upon wake-up from DRX include that the UE may decode the mmW PDCCH upon wakeup from DRX, according to the configured mmW on-Duration. Upon detecting beam alignment failure (for example, based on the one or more PDCCH decode failures), the UE may trigger beam re-acquisition procedure. The UE may use a code point on the LTE UL PUCCH/MAC CE to signal the SCeNB to trigger a beam re-acquisition procedure. The SCeNB may configure the UE to use a specific RACH resource to indicate the requirement for mmW beam re-acquisition procedure. The SCeNB may trigger the mmW beam re-alignment procedure for the UE, for example, based on the absence of ACK/NACK feedback from the UE. The SCeNB may signal on-demand the mmW measurement resource for mmW beam re-acquisition procedure. The UE may wait for a subsequent mmW periodic measurement resource to re-align the DL receive beam. The SCeNB may suspend the data transmission on the mmW carrier until the beam re-acquisition procedure is completed. If user plane protocol option 3C is used, the SCeNB may forward the data using the LTE carrier while the mmW beam re-acquisition procedure is ongoing.

Although features and elements are described above in particular combinations, one of ordinary skill in the art will appreciate that each feature or element may be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, optical media such as CD-ROM disks, and digital versatile disks (DVDs). A processor in association with software may be used to implement a radio frequency transceiver for use in a WTRU, WTRU, terminal, base station, RNC, or any host computer.

The invention claimed is:

1. A wireless transmit/receive unit (WTRU), comprising:
a processor, wherein the processor is configured to:
receive, from a network entity, a subset of a millimeter wave beam forming reference signal (MBFRS);
receive, from the network entity, a reporting resource that is based on the received subset of the MBFRS;
send, to the network entity, preferred millimeter wave downlink beam information that is based on the reporting resource;
measure a downlink transmit beam; and
send, to the network entity, the measurement for the downlink transmit beam prior to a millimeter on-duration.

2. The WTRU of claim 1, the processor is configured to receive the subset of the MBFRS when the WTRU is in a resource radio control (RRC) connected mode.

3. The WTRU of claim 1, wherein the subset of the MBFRS is based on a location of the WTRU.

4. The WTRU of claim 1, wherein the subset of the MBFRS is based on the WTRU being located within a small cell.

5. The WTRU of claim 1, wherein the WTRU receives the reporting resource in a time period in which the WTRU receives the subset of the MBFRS.

6. The WTRU of claim 1, wherein the WTRU receives the reporting resource based on a mobility of the WTRU, wherein the mobility of the WTRU comprises one or more of a speed of the WTRU and a rate of an orientation change of the WTRU.

7. The WTRU of claim 1, wherein the network entity is an evolved Node-B (eNB).

8. The WTRU of claim 1, wherein the network entity is a small cell eNode-B (SCeNB).

9. A method, the method comprising:
receiving, at a wireless transmit/receive unit (WTRU), a subset of a millimeter wave beam forming reference signal (MBFRS);
receiving, at the WTRU, a reporting resource that is based on the received subset of the MBFRS;
sending, to a network entity, preferred millimeter wave downlink beam information that is based on the reporting resource;
measuring a downlink transmit beam; and
sending, to the network entity, the measurement for the downlink transmit beam prior to a millimeter on-duration.

10. The method of claim 9, wherein the subset of the MBFRS is received by the WTRU when the WTRU is in a resource radio control (RRC) connected mode.

11. The method of claim 9, wherein the subset of the MBFRS is based on a location of the WTRU.

12. The method of claim 9, wherein the subset of the MBFRS is based on the WTRU being located within a small cell.

13. The method of claim 9, wherein the WTRU receives the reporting resource in a time period in which the WTRU receives the subset of the MBFRS.

14. The method of claim 9, wherein the WTRU receives the reporting resource is based on a mobility of the WTRU, wherein the mobility of the WTRU comprises one or more of a speed of the WTRU and a rate of an orientation change of the WTRU.

15. The method of claim 9, wherein the network entity is an evolved Node-B (eNB).

16. The method of claim 9, wherein the network entity is a small cell eNode-B (SCeNB).

17. A wireless transmit/receive unit (WTRU), comprising:
a processor, wherein the processor is configured to:
determine that the WTRU is in a radio resource control (RRC) connected mode;
receive, from a network entity, a subset of a millimeter wave beam forming reference signal (MBFRS);
receive, from the network entity, a reporting resource that is based on the subset of the MBFRS;
send, to the network entity, preferred millimeter wave downlink beam information that is based on the reporting resource;
measure a downlink transmit beam; and
send, to the network entity, the measurement for the downlink transmit beam prior to a millimeter on-duration.

18. The WTRU of claim 17, wherein the subset of the MBFRS is based on a location of the WTRU.

19. The WTRU of claim 17, wherein the subset of the MBFRS is based on the WTRU being located within a small cell.

20. The WTRU of claim 17, wherein the WTRU receives the reporting resource in a time period in which the WTRU receives the subset of the MBFRS.

\* \* \* \* \*

UNITED STATES PATENT AND TRADEMARK OFFICE
CERTIFICATE OF CORRECTION

PATENT NO. : 10,462,774 B2
APPLICATION NO. : 15/716466
DATED : October 29, 2019
INVENTOR(S) : Yugeswar Deenoo et al.

Page 1 of 1

It is certified that error appears in the above-identified patent and that said Letters Patent is hereby corrected as shown below:

Column 32; Line 2: Replace "reporting resource is based on a mobility" with --reporting resource based on a mobility--

Signed and Sealed this
Thirty-first Day of December, 2019

Andrei Iancu
*Director of the United States Patent and Trademark Office*